US007076552B2

(12) United States Patent
Mandato

(10) Patent No.: US 7,076,552 B2
(45) Date of Patent: Jul. 11, 2006

(54) UNIVERSAL QOS ADAPTATION FRAMEWORK FOR MOBILE MULTIMEDIA APPLICATIONS

(75) Inventor: Davide Mandato, Fellbach (DE)

(73) Assignee: Sony International (Europe) GmbH, Berlin (DE)

( * ) Notice: Subject to any disclaimer, the term of this patent is extended or adjusted under 35 U.S.C. 154(b) by 770 days.

(21) Appl. No.: 09/864,766

(22) Filed: May 23, 2001

(65) Prior Publication Data

US 2002/0010771 A1  Jan. 24, 2002

(30) Foreign Application Priority Data

May 24, 2000  (EP) .................................. 00111191

(51) Int. Cl.
*G06F 15/16* (2006.01)
*G06F 15/173* (2006.01)
*H04Q 7/20* (2006.01)
*H04Q 7/00* (2006.01)

(52) U.S. Cl. ............... 709/226; 709/203; 709/227; 709/228; 709/229; 709/230; 709/231; 370/239; 370/328; 370/338; 370/395.21; 370/395.51; 455/450; 455/451; 455/452; 455/453

(58) Field of Classification Search ............... 709/203, 709/223, 224, 225, 226–231; 370/239, 328, 370/338, 395.21–51; 455/450–453
See application file for complete search history.

(56) References Cited

U.S. PATENT DOCUMENTS 5,974,036 A * 10/1999 Acharya et al. ............ 370/331

| 6,154,778 | A | * | 11/2000 | Koistinen et al. | ............ 709/228 |
|---|---|---|---|---|---|
| 6,404,738 | B1 | * | 6/2002 | Reininger et al. | .......... 370/236 |
| 6,631,122 | B1 | * | 10/2003 | Arunachalam et al. | ..... 370/332 |
| 6,671,724 | B1 | * | 12/2003 | Pandya et al. | ............... 709/226 |
| 6,766,365 | B1 | * | 7/2004 | Huang et al. | ............... 709/223 |
| 6,779,181 | B1 | * | 8/2004 | Yu et al. | ...................... 718/102 |
| 6,810,422 | B1 | * | 10/2004 | Cross | ......................... 709/227 |

FOREIGN PATENT DOCUMENTS

EP           0 806 855           11/1997

OTHER PUBLICATIONS

Kurt Rothermel et al., "Qos Negotiation and Resource Reservatio for Distributed Multimedia Application", Jun. 1997. Procedures from IEEE Internation Conference on Multimedia Computing and Systems, pp. 310-326.*
Barzilai P et al: "Design and Implementation of an RSVP-Based Quality of Serice Architecture for an Integrated Services Internet" IEEE Journal on Selected Areas in Comuniations, US, IEEE Inc. New York, vol. 16, No. 3, Apr. 1, 1998, pp. 397-413, XP000740059.

* cited by examiner

*Primary Examiner*—Jason Cardone
*Assistant Examiner*—Hassan Phillips
(74) *Attorney, Agent, or Firm*—Oblon, Spivak, McClelland, Maier & Neustadt, P.C.

(57) ABSTRACT

The present invention relates to a processing system and to pieces of software for one or more communication networks. Applications are provided with a platform and a network-independent framework for achieving cross-adaptability by providing components for QoS management in the communication network(s) by means of a component coordinator unit.

37 Claims, 9 Drawing Sheets

A formal description of the proposed QoS Adaptation Framework

Figure 3:
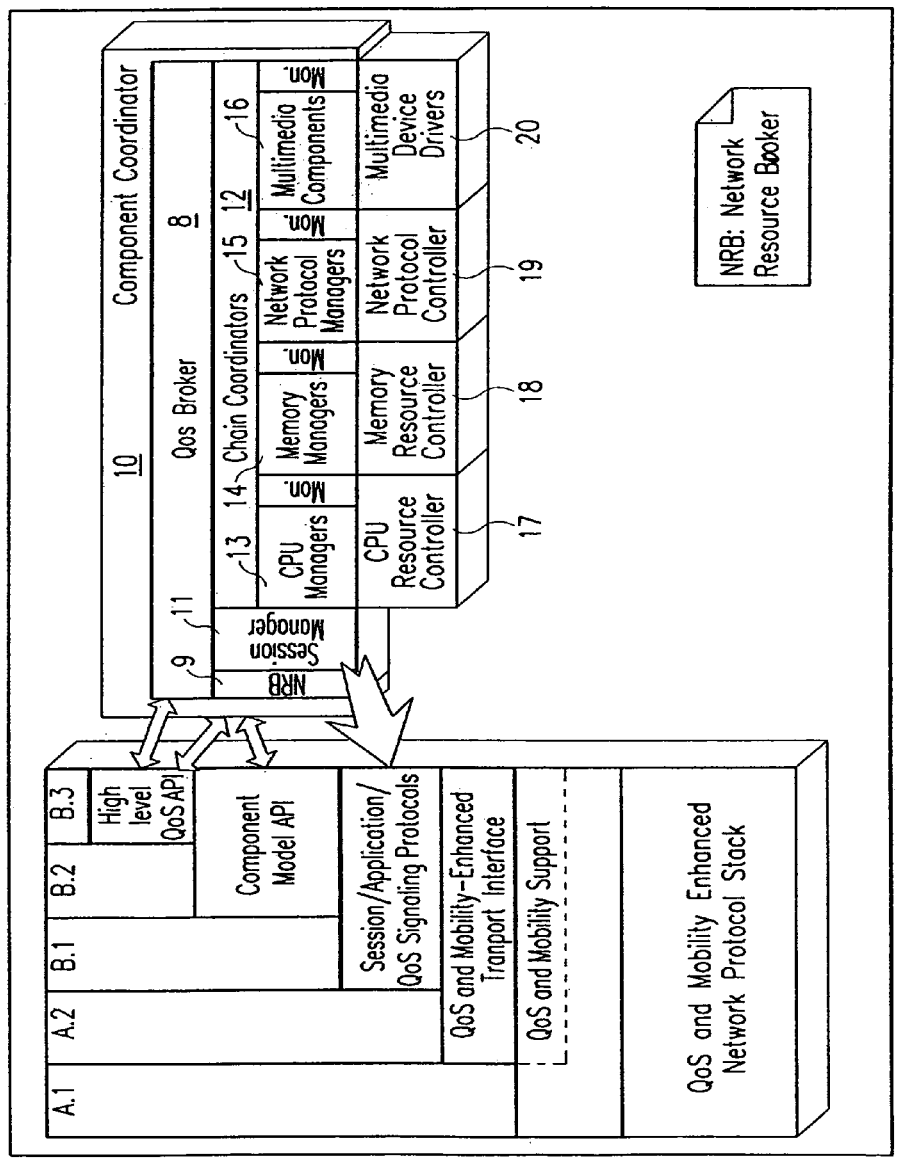

Fig. 3  End System Reference Architecture

Example of single and multiple association

A formal description of the proposed QoS Adaptation Framework

Logical structure of the negotiated information

Degradation Path information exchanged during negotiation

Association/Stream Set-up and HAND-Over scenarios

UNIVERSAL QOS ADAPTATION FRAMEWORK FOR MOBILE MULTIMEDIA APPLICATIONS

The invention hereby presented generally relates to the field of mobile multimedia middle-ware, computer networking, distributed processing systems, Quality of Service, handheld computers, web browsers, QoS brokers, QoS adaptation architectures, QoS negotiation protocols, and wireless communication.

Particularly, the present invention relates to a processing system for one or more communication networks and to pieces of software for one or more communication networks, the pieces of software being loadable in a memory means in one or more notes of the one or more communication networks.

The processing system for one or more communication networks according to the present invention is claimed in claim 1 and provides applications with a platform- and network independent framework for achieving cross-adaptability by providing components for QoS management in the communication network(s) by means of a component coordinator unit 10. The pieces of software for one or more communication networks according to the present invention are claimed in claim 21, are loadable in memory means of one or more notes of the one or more communication networks and provide applications with a platform-and network independent framework for achieving cross-adaptability by providing components for QoS management in the communication network(s) by means of a component coordinator unit 10.

Advantageous features are claimed in the respective subclaims.

Advantageously, the generic framework uses a platform- and network-neutral set of application adaptation mechanisms, including a QoS negotiation and re-negotiation protocol. In this case, the protocol may advantageously use piggyback mechanisms for negotiating and re-negotiating QoS parameters. Further advantageously, the generic framework bases on an application model in which each application is allocated to one of a set of application classes having different QoS levels. In this case, fallback mechanisms may be provided for a backward compatibility between the application classes. Advantageously, said generic framework bases on a modular progressive approach to address different types of applications which span from existing applications to envisioned more sophisticated applications that rely on middleware for achieving cross-adaptability. Further, the generic framework may base on a communication model with different functional communication levels for exploiting the various resources in a coordinated manner so as to achieve the desired overall QoS level. Hereby, the communication levels may include an application, a session, an association and a stream level.

Advantageously, a QoS broker unit is provided, which is managed by the component coordinator unit and coordinates local and remote resource management by using said negotiation and re-negotiation protocol. In this case, a network resource booker unit may be provided, which is directly coordinated by the QoS booker unit and manages network resource reservation mechanisms. Further, a session manager unit may provided, which is directly coordinated by the QoS booker unit for establishing and managing sessions in an implementation-independent way.

Advantageously, one or more chain coordinator units are provided, which are managed by the QoS broker unit and which manages one or more component chains, each chain being associated with a stream. Hereby, one or more CPU-manager units may be provided, which are coordinated by the chain coordinator units for managing CPU-resource usage. A CPU-resource controller unit may be provided, which provides the CPU-manager units with platform-independent resource status information retrieval and control.

Further advantageously, one or more memory manager units may be coordinated by the chain coordinator units for managing memory resource usage. A memory controller unit may provide the memory manager units with platform-independent resource status information retrieval and control. Further, one or more network protocol manager units may be coordinated by the chain coordinator units for managing network protocol resource usage. The network protocol controller unit may provide the network protocol manager units with resource status information retrieval and control.

One or more multimedia component units may be coordinated by the chain coordinator units for managing multimedia resources. Here, the multimedia controller may provide the multimedia component units with platform-independent resource status information retrieval and control.

This invention proposes a universal framework, upon which end-system architectures can be developed, providing QoS and mobility awareness to any kind of mobile multimedia and (within certain limits) legacy applications. More specifically, a technical solution (middleware) is hereby described, along with a meta-protocol for End-to-End QoS negotiation. These concepts have been designed so as to render applications elastic to QoS fluctuations and/ violations with respect to the given QoS contract.

Figure 1:
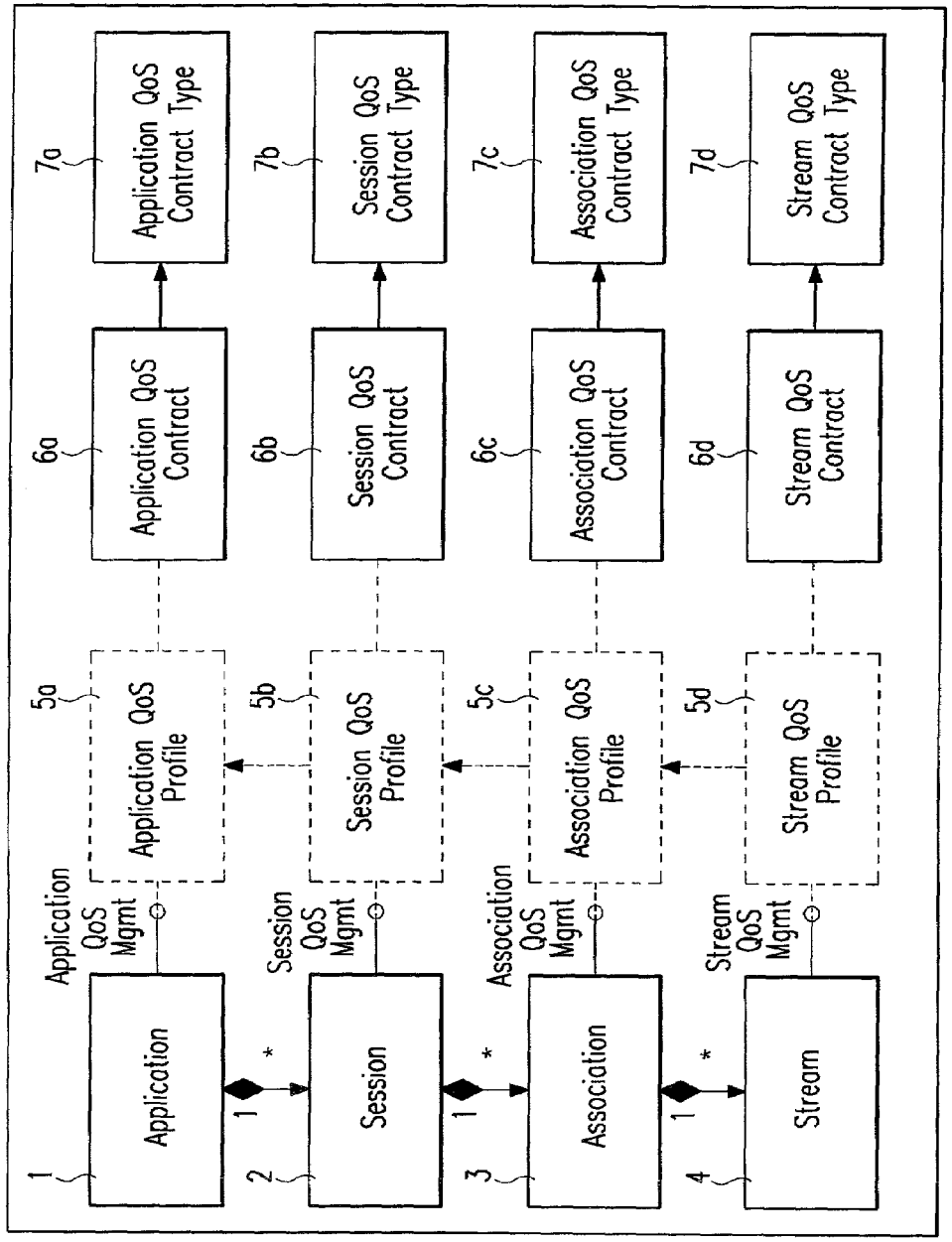
Figure 2:
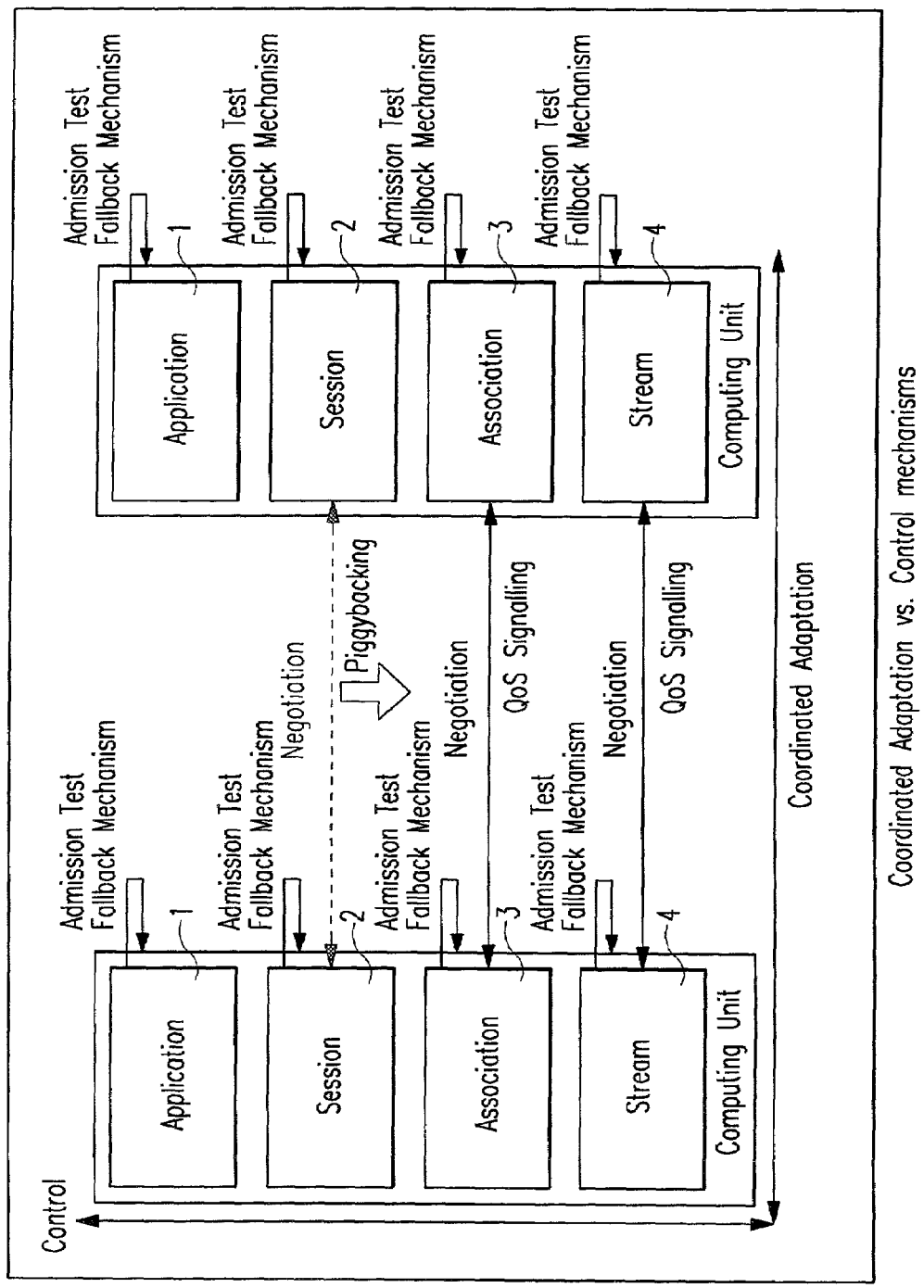
Figure 4:
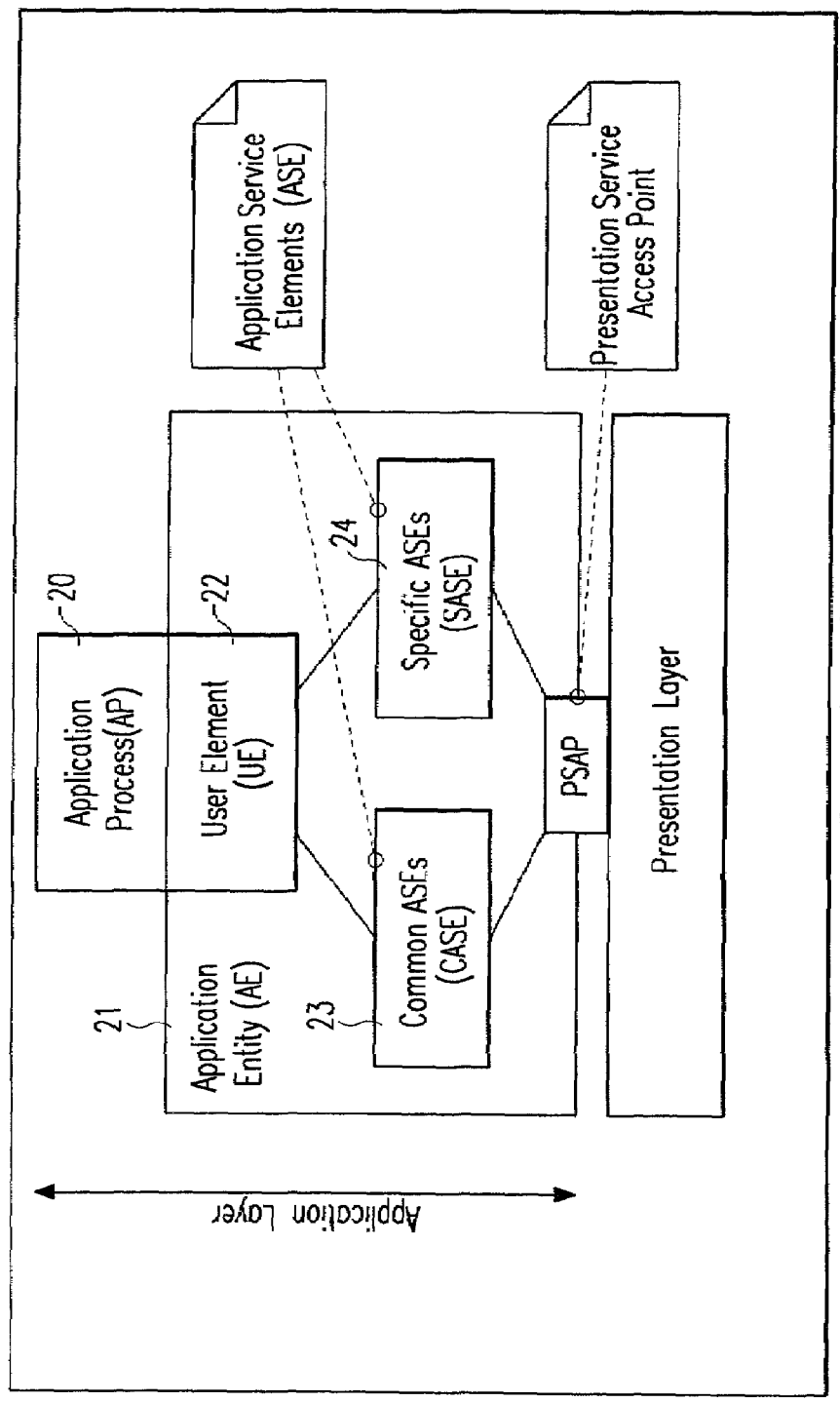
Figure 5:
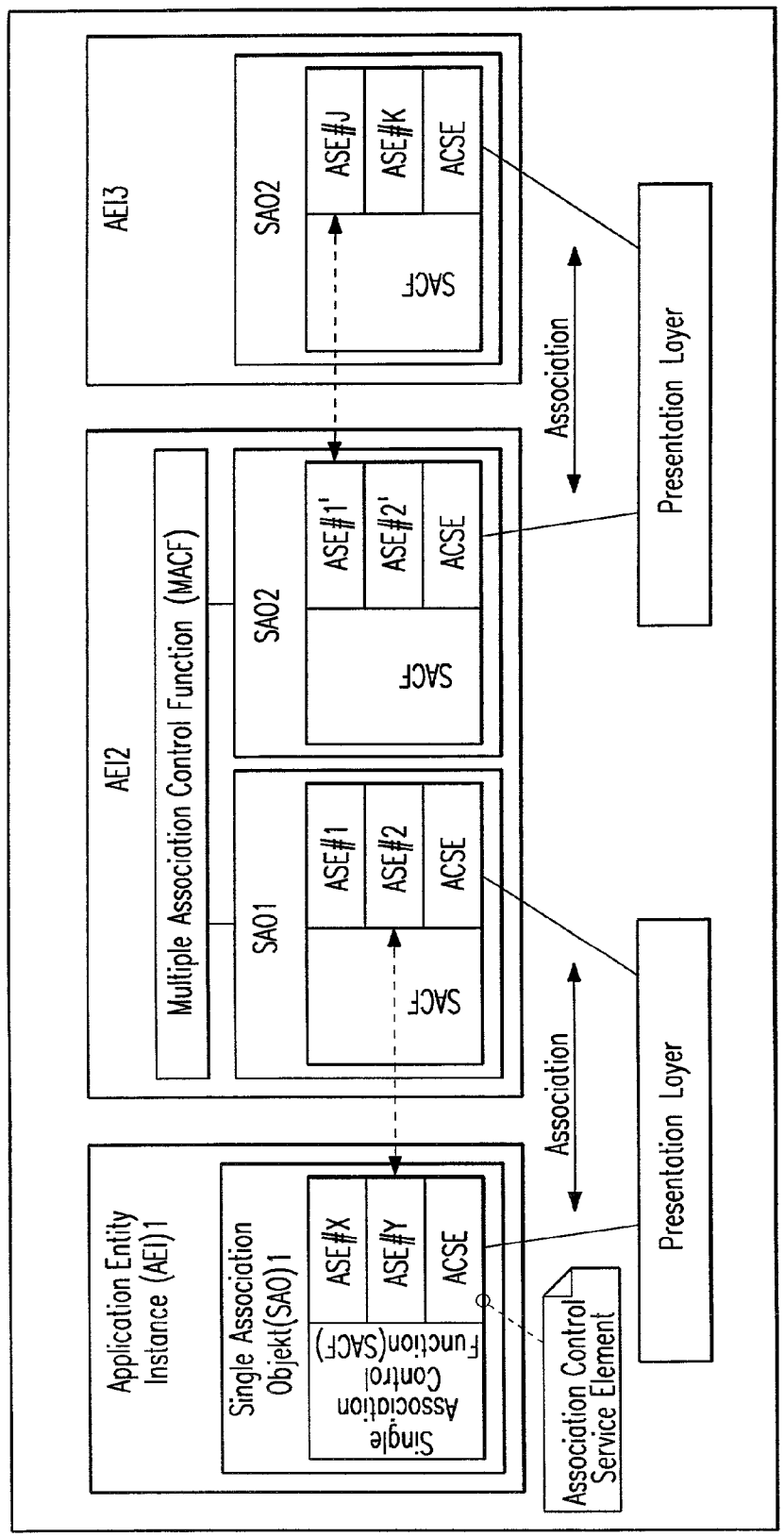
Figure 6:
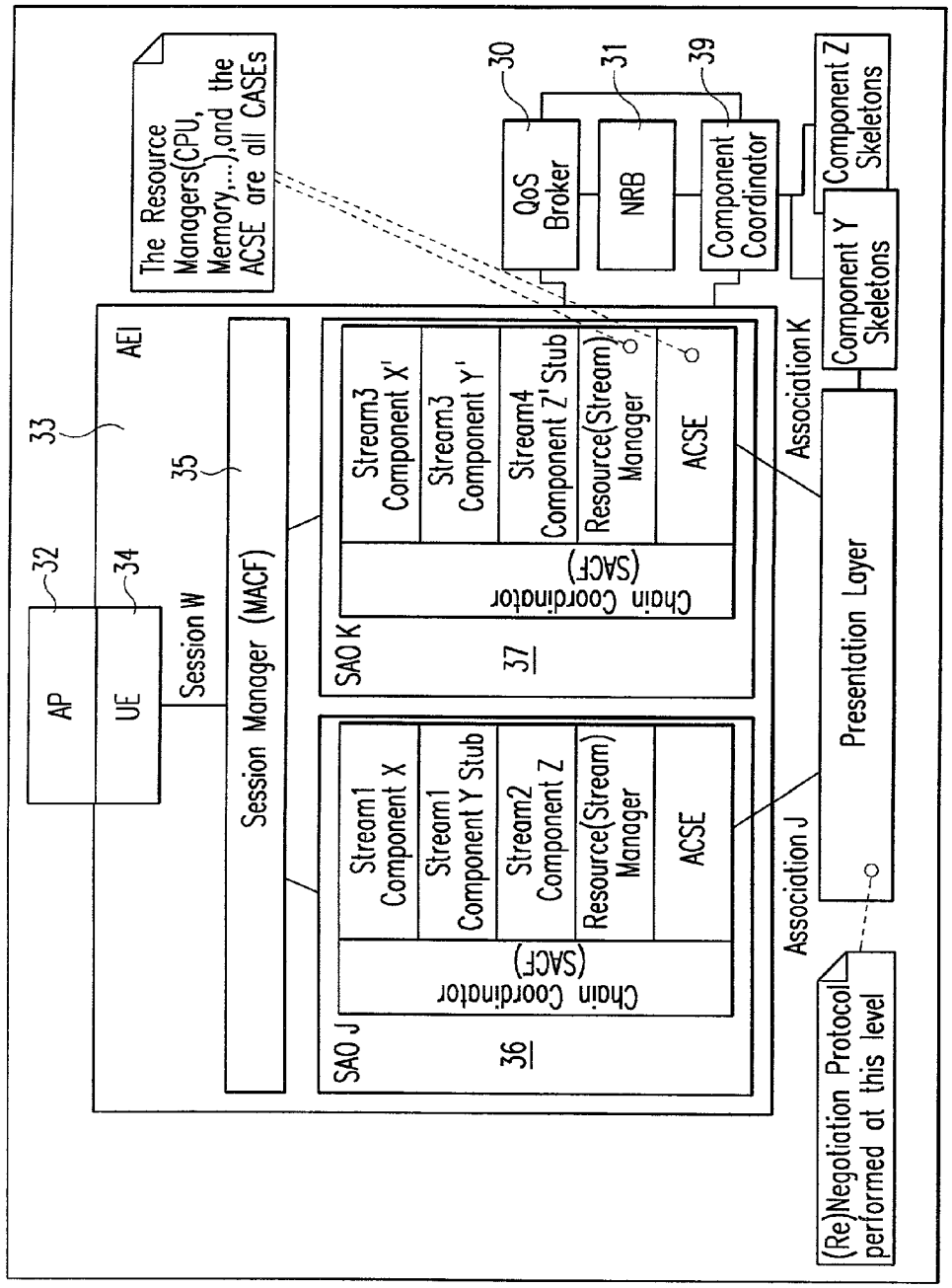
Figure 7:
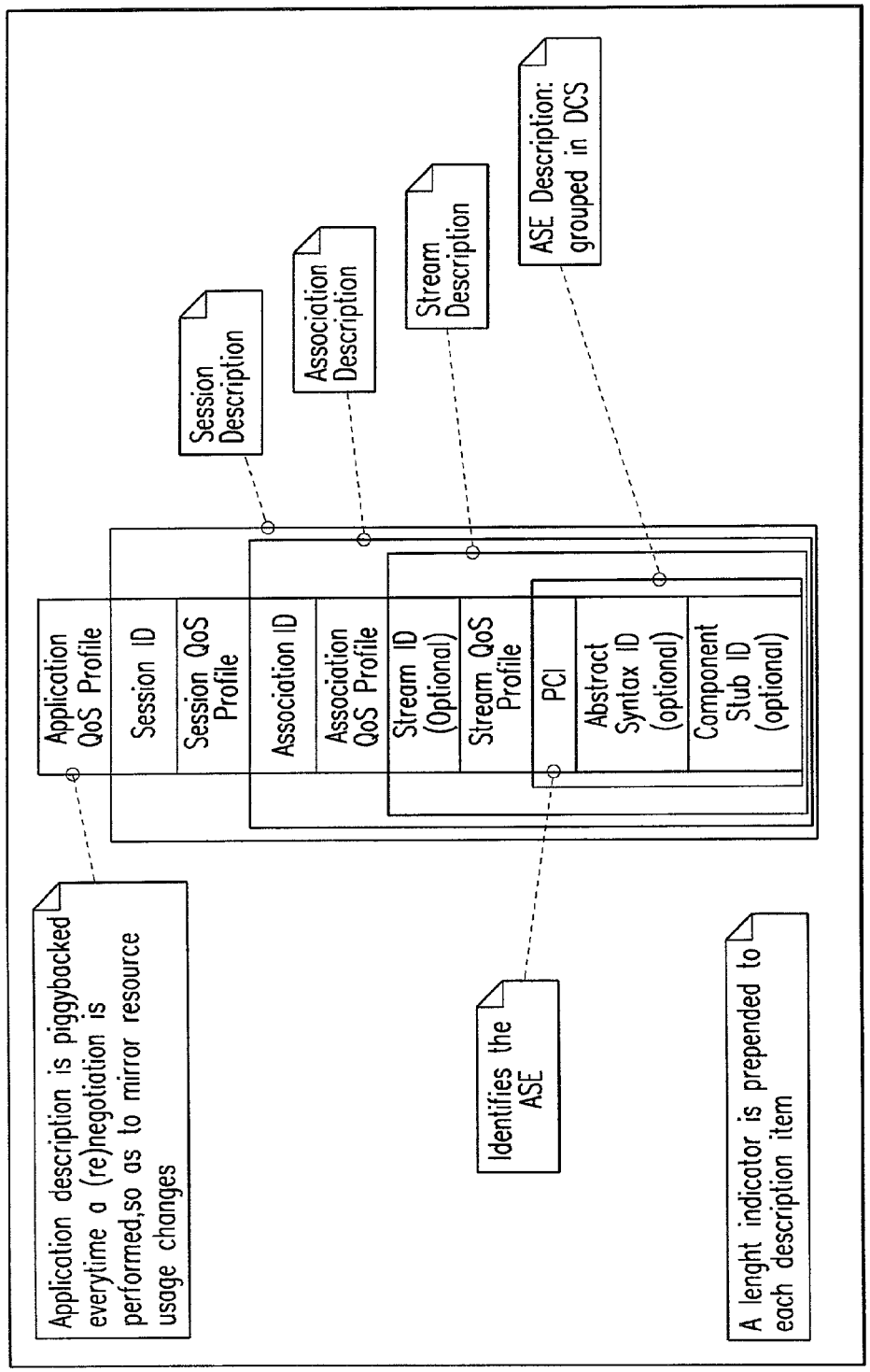
Figure 8:
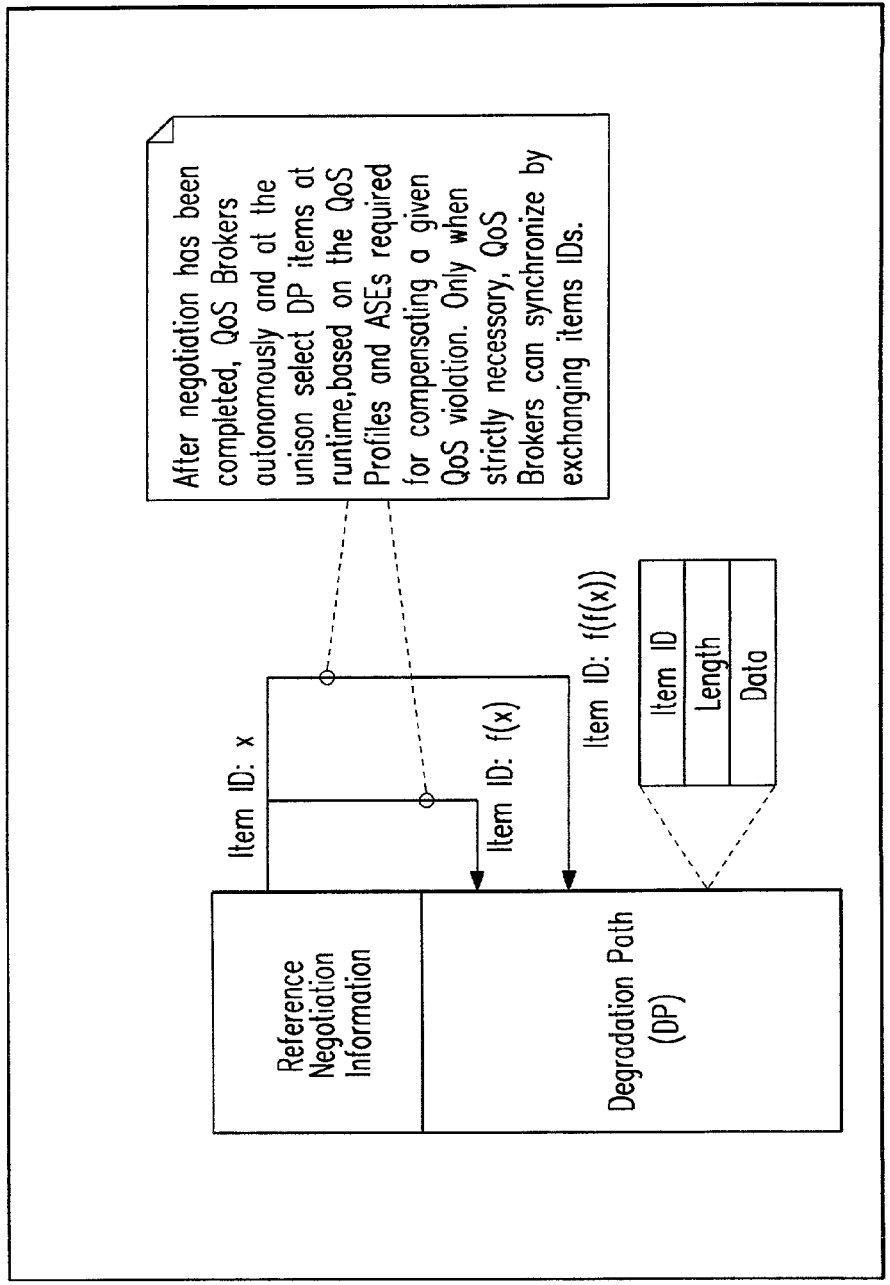
Figure 9:
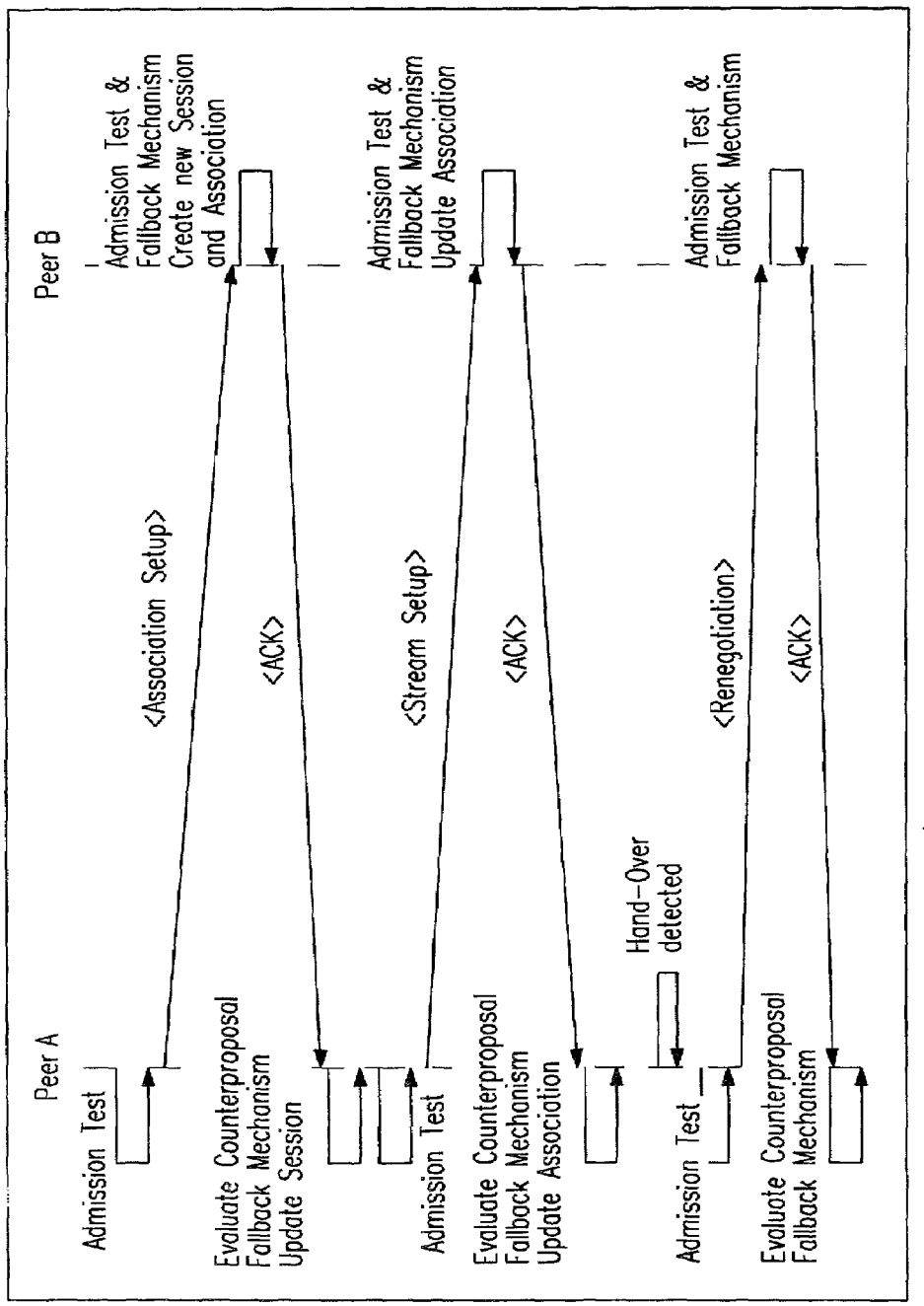

The present invention is explained in more detail in the following description in relation to the enclosed drawings, in which FIG. 1 shows a scheme of QoS adaptation framework according to the present invention, FIG. 2 shows a scheme of coordinated adaptation versus control mechanisms according to the present invention, FIG. 3 shows an example for an end system reference architecture, FIG. 4 shows a scheme of the OSI application layer according to the present invention, FIG. 5 shows an example of single and multiple association, FIG. 6 shows a formal description of the proposed QoS adaptation framework according to the present invention, FIG. 7 shows a logical structure of the negotiated information according to the present invention, FIG. 8 shows a degradation path information exchanged during negotiation according to the present invention, and FIG. 9 shows an example for association/stream set-up and hand-over scenarios according to the present invention.

The following table 1 gives the definitions of terms used in the present description.

TABLE 1

Terminology

| Term | Definition |
| --- | --- |
| Adaptation | Mechanisms altering the application behavior so much as to compensate any fluctuation and/or even dramatic change in data transmission and/or processing quality, based on some user requirements specifying said quality. These mechanisms can be included in the application, or provided by some external entity (e.g. middleware). |

TABLE 1-continued

Terminology

| Term | Definition |
|---|---|
| Application | A computer program with a user interface. This invention addresses however with this term also computer programs acting as service providers, as e.g. a Video on Demand server. This kind of applications usually does not feature any interaction with users locally, except for a system administration interface. |
| Association | Relationship between two applications, providing the required reference structure for allowing said applications to cooperate. |
| Component | A prefabricated, customizable software unit featuring well-defined interfaces. Examples of components are Java-Beans, DCOM-objects, or CORBA-objects |
| Connection | Semi-permanent relationship between two nodes in a network; within the context of said relationship, data can be exchanged in an exclusive and controlled manner. |
| Deadline | A time limit, for the completion (or the fulfillment of a quota) of a task assignment. |
| Degradation Path | A list of alternative QoS profiles, each associated with a specific set of altered conditions with respect to the reference QoS requirements originally specified by the user. This list is used by QoS Brokers in order to degrade (or upgrade) the QoS in a controlled manner. |
| Device Driver | A piece of software that enables a computer to communicate with a peripheral device. |
| Differentiated Services, DiffServ, DS | Architecture providing different levels of service based on the differentiation of classes of Internet traffic. Rather than simply providing the same "best-effort" service to all network demands, Differentiated Services hopes to achieve a higher quality of service by differentiating between the needs of various predefined classes of service. |
| Elastic Application | Application featuring adaptation, either through some built in capabilities, or thanks to some external means. An application capable of dealing with mutated networking and computing conditions in a controlled manner. |
| Framework | A set of correlated software units, embodying an abstract design for solutions to a number of related problems. |
| Hand Over/ Hand Off | The mechanism of keeping a connection alive while one of the corresponding nodes is moving across interconnected network infrastructures. |
| Integrated Services, IntServ | The transport of audio, video, real-time, and classical data traffic within a single network infrastructure. Accomplished by reserving and allocating the proper amount of network resources to each given connection, based on the type of traffic that shall be carried over said connection. |
| Mobility, User | The ability of a user to access telecommunications services from different terminals and different networks, and the capability of the network to identify and authorize that user. |
| Mobility, Terminal | The ability of a terminal to access telecommunications services from different locations and while in motion, and the capability of the network to identify and locate that terminal. |
| Multimedia Service | A service in which the interchanged information consists of more than one type (e.g. video, voice, data, and graphics). Multimedia services have multi-valued attributes, which distinguish them from traditional telecommunication services such as voice or data. A multimedia service may involve multiple parties, multiple connections, the addition/deletion of resources and users within a single session. |
| Negotiation | Mutual discussions intended to produce an agreement with another party or parties. More specifically, QoS negotiation deals with the sorting out of a mutual set of QoS characteristics, as a tradeoff between each party's requirements. |
| Process | A part of a running software program or other computing operation that does a single task |
| Quality of Service, QoS | The collective effect of service performance which determines the degree of satisfaction of a user of the service |
| QoS Broker | Software unit orchestrating local, remote, and network resources, in order to provide and maintain a given level of QoS, as requested by all the cooperating parties. More specifically, the QoS Broker coordinates resource management across the various software and hardware units used within the system. To this extent, the QoS Broker manages QoS parameter translation, admission test, and negotiation. Therefore, the QoS Broker acts as an intermediary, dispensing cooperating entities from being aware of operational details concerning with other entities. |
| QoS Contract | Agreement between a user and a given service provider, specifying QoS requirements and constraints, as well as the policies required to keep track about QoS during all phases of said service. |
| QoS Contract Type | Represents a QoS Category: it captures the structure of a class of QoS Contracts, by identifying how individual QoS Contracts specify the QoS properties over a given set of QoS parameter types (also known as dimensions). Each parameter type consists of a name and a domain of values. QoS specifications can be simply intended as a set of constraints over said domains, one per parameter type. |
| QoS Profile | Associates one or many QoS Contracts with a set of interface elements (methods) for a given interface. |
| QoS Violations | QoS Contract violations, which might occur even with service guarantees, because of resources shortage, e.g., network congestion. |
| Real-time OS | An Operating System featuring real-time capabilities. Real-time is a human rather than a machine sense of time, indicating the level of computer responsiveness that a user senses as sufficiently immediate or that enables the computer to keep up with some external vital process |
| Session | A multimedia session is a set of multimedia senders and receivers, and the data streams flowing from senders to receivers. A multimedia conference is an example of a multimedia session. Within the context of this invention, a session is an even more generic, not necessarily bound to multimedia concepts. |
| Stream/ Flow | The sequence of information being transmitted from the source endpoint to the destination endpoint of a given connection |
| Task | The basic unit of programming that an operating system controls. Depending on how the operating system defines a task in its design, this unit of programming may be an entire program or each successive invocation of a program. |

The following table 2 gives a list of abbreviations use in the present description.

TABLE 2

Abbreviations

| | |
|---|---|
| AAA | Authentication, Authorization, Accounting |
| ACSE | Association Control Service Element |
| ACTS | Advanced Telecommunication Technologies & Services |
| AE | Application Entity |
| AEI | Application Entity Instance |
| AP | Application Process |
| ASE | Application Service Element |
| CASE | Common ASE |
| COTS | Commercial Off-The-Shelf |
| HW | Hardware |
| GUI | Graphical User Interface |
| IP | Internet Protocol |
| MACF | Multiple Association Control Function |
| MMU | Memory Management Unit |
| NRB | Network Resource Booker |
| PDA | Personal Data Assistant |
| QoS | Quality of Service |
| SACF | Single Association Control Function |
| SAO | Single Association Object |
| SASE | Specific ASE |
| SW | Software |
| UE | User Element |
| UML | Unified Modeling Language |

As of this writing, following technologies are known, which are closely related to the topic hereby presented:

| Sub-Topic | Technologies | IP Owner Organizations and/or Companies |
|---|---|---|
| QoS Broker QoS Negotiation Context Negotiation | QoS Broker OSI Presentation Layer: Context Negotiation Protocol | Many academic-works have been published ISO, ITU-T (Rec. X.216 (07/94) INFORMATION TECHNOLOGY . . . OPEN SYSTEMS INTERCONNECTION . . . PRESENTATION SERVICE DEFINITION) |

Table 3 lists the problems addressed by this invention. Each problem is identified by a P_ID identifier, later used for easy referencing the given problem item. Furthermore, a Key Aspect field captures the most meaningful aspect of the given problem item.

TABLE 3

Lists of problems addressed by this invention

| P ID | Problem Description | Key Aspect |
|---|---|---|
| 1 | Existing architectures do not take into account how various types of applications can manage end-to-end QoS in mobile scenarios. | Interoperability |
| 2 | Many of the existing architectures are not modular, rather full-fledged solutions | Modularity |
| 3 | Many of the existing architectures make some assumptions on the network resource reservation and allocation mechanisms | Configurability |
| 4 | The mechanisms dealing with application adaptation to mutated conditions of the network and of the computing environment (e.g. QoS violations, changes in resource utilization) have been addressed so far without a clear distinction of the various phases of applications and communications lifecycles. | Adaptability |
| 5 | Negotiation protocols have been so far defined as proprietary protocols. | Standardization |

Different service interfaces can be identified above the OSI Transport Layer. Each interface serves a specific type of application. Table 4 describes each possible type of applications with respect to QoS and mobility aspects. The interface identifier indicated in the last column of said table is thereinafter used for referencing application types.

TABLE 4

| | | Application Taxonomy | |
|---|---|---|---|
| Legacy | Not QoS-aware | Use sheer transport services. QoS can be externally enforced-transparently to the applications-by manipulating packets (DiffServ marking) and/or explicitly reserving network resources (e.g. RSVP) through a configuration tool. Example: web browser | A.1 |
| | QoS-aware | Limited use of a QoS-Enabled Transport Service Interface, in conjunction with the aforementioned configuration tool. | A.2 |
| QoS-aware | Self-managing | Use existing (or soon-to-be-defined) OSI Session Layer protocols (e.g. SIP, H.323, RTP/RTCP) and QoS signaling protocols (e.g. RSVP) Capable of performing DiffServ Marking Feature adaptation logic for handling QoS violations Directly handle multimedia resources (e.g. Frame Grabber, codecs). Example: Voice over IP clients | B.1 |

TABLE 4-continued

| | | Application Taxonomy | |
|---|---|---|---|
| | Component-based | Use abstract Session Layer Components, which can be mapped to any existing or future standard Session Layer protocols. Can use prefabricated multimedia components. Can use a framework (Component Coordinator-CC), which manages how components are pushed in/pulled out to/from a flow, and eventually reconfigured, in a dynamic manner. Can include a proprietary full-fledged QoS Broker that (as one of its multiple functionality), can manipulate multimedia components through said CC. This functionality is however limited to the given application. Resource coordination with other applications can be made only indirectly, as long as proper low-level resource monitoring and control mechanisms are made available (e.g. through the OS). This is an envisioned kind of applications, not yet available on the market. | B.2 |
| | Broker-assisted | Use an external QoS Broker through a non-procedural language. The QoS Broker can manage multiple applications, as opposed to the B.2 and (eventually) B.1 QoS Broker functionality, which is limited to one application only. Users control the perceived QoS through a separate, application independent, QoS Broker GUI, either in an entry level or expert mode. Template user profiles are made available to users, who can use them for creating their own profiles, either program-assisted (entry-level mode) or directly (expert mode). This is an envisioned kind of applications, not yet available on the market. | B.3 |

This invention focuses on architecture providing QoS and mobility awareness to all the aforementioned types of applications. More specifically, a technical solution (middleware) is hereby described, with respect to application types B.2 and B.3, and to the relationship of said application types with the other listed ones above. Table 5 summarizes the hereby-proposed solutions to the problems listed in Table 3.

TABLE 5

Executive summary of claimed solutions

| P ID | Key Aspect | Solution Description |
|---|---|---|
| 1 | Interoperability | Concerning the (re)negotiation process, the various types of applications described in Table 4 need to feature some form of backward compatibility, through fallback mechanisms. This invention describes such mechanisms in Table 6. |
| 2 | Modularity | Various types of applications can benefit from the proposed architecture, by using exactly the amount of support they need for accomplishing their tasks. Moreover, a component-based model allows applications to reuse commercially available multimedia components. One can also replace the latter with other components, based on mutated conditions (QoS violations) and/or cost factors (better quality/price ratio). See § Modularity. |

TABLE 5-continued

Executive summary of claimed solutions

| P ID | Key Aspect | Solution Description |
|---|---|---|
| 3 | Configurability | The proposed architecture is not tightly coupled to any particular network model. For a description purpose only, the given architecture is described with respect to an edge IP network scenario. Users' network packets enter/exit the network through an IntServ-based radio access network. Whereas the long haul traffic traverses as a DiffServ aggregate a core IP network (an Intranet or the Internet). The architecture can however be configured so as to use any available means for QoS signaling mechanism. To this extent, a Network Resource Booker (NRB) component is hereby defined. The configuration tool indicated in Table 4 with respect to application types A.1 and A.2 is basically a GUI for interactively managing said NRB component (which can be in any case used programmatically). See § Configurability. |
| 4 | Adaptability | This invention presents an application and communication models, which identify the major lifecycle phases of a multimedia application; each phase is associated with a specific adaptation mechanism. These mechanisms are organized in a framework. See § Adaptation mechanisms. |
| 5 | Standardization | This invention proposes the use of a platform- and network-neutral negotiation and re-negotiation protocol. Given that SIP features both these characteristics, the hereby proposed (re)negotiation protocol resembles said standard. See § Proposal of a Standard QoS Negotiation Protocol. A SIP binding is hereby described as well. See § Example. |

As an option, each application class can be associated with a set of agents, for guaranteeing end to end coordination to the greatest possible extent. Each agent would be tailored to deal with each case of backward compatibility, as indicated in Table 6.

TABLE 6

Backward Compatibility Mechanisms

| From | To | Fallback Mechanism Description |
|---|---|---|
| B.3 | B.2 | B.3 and B.2 QoS Brokers may be incompatible: in such a case, after a failed negotiation attempt, the peers will handle resources only locally. Otherwise the usual full-fledged negotiation process can take place. In the opposite direction, if B.3 applications cannot handle the negotiation process initiated by B.2 applications, resources are managed only locally. |
| | B.1 | B.1 applications may feature no negotiation at all or a form of negotiation that is incompatible with the QoS Brokers assisting B.3 applications. In such a case, after a failed negotiation attempt from B.3, the peers will handle resources only locally. In the opposite direction, B.1 initiating applications may start some form of negotiation: if B.3 applications cannot handle this, resources are managed only locally. |
| | A.2 | No negotiation takes place at all. In the case of a B.3 initiating applications, a negotiation attempt would fail. Resources are managed only locally. |
| | A.1 | No negotiation takes place at all. In the case of a B.3 initiating applications, a negotiation attempt would fail. Resources are managed only locally. |
| B.2 | B.1 | B.1 applications may feature no negotiation at all or a form of negotiation that is incompatible with the QoS Brokers included into B.2 applications. In such a case, after a failed negotiation attempt from B.2, the peers will handle resources only locally. In the opposite direction, B.1 initiating applications may start some form of negotiation: if B.2 applications cannot handle this, resources are managed only locally. |
| | A.2 | No negotiation takes place at all. In the case of a B.2 initiating applications, a negotiation attempt would fail. Resources are managed only locally. |
| | A.1 | No negotiation takes place at all. In the case of a B.2 initiating applications, a negotiation attempt would fail. Resources are managed only locally. |
| B.1 | A.2 | No negotiation takes place at all. In the case of a B.1 initiating applications, a negotiation attempt (if any) would fail. Resources are managed only locally. |
| | A.1 | No negotiation takes place at all. In the case of a B.1 initiating applications, a negotiation attempt (if any) would fail. Resources are managed only locally. |
| A.2 | A.1 | No negotiation takes place at all. |

I. Modularity

The proposed architecture is modular with respect to two aspects:

The architecture harmonizes various types of applications, which may or may not be compatible with each other. This modular approach allows developers to progressively deploy the given architecture.

The middleware solution hereby proposed is centered on the concept of a component model API. The QoS Broker can be a component itself. Components can even be deployed at runtime (e.g. components developed as Java Beans can be downloaded from a remote repository). In order to deal with components, the hereby-proposed middleware is centered on the concept of a Component Coordinator (CC). The CC allows user applications to manipulate components and control their lifecycle (deployment, configuration, activation, deactivation, and disposal). More specifically, components can be "chained together", so as to combine their functionality in such a way information gets processed in a given, desired manner. Applications and/or the QoS Broker can modify chains even at runtime, so as to promptly respond to a given stimulus (e.g. change codec).

II. Configurability

The proposed architecture is configurable with respect to two aspects:

The QoS-Enabled Transport Interface can be configured so as to map to specific QoS Signaling Protocols. E.g. a socket based QoS-Enabled Transport Interface can be configured so as to use RSVP and/or a DS Marker for resource reservation/allocation signaling. This configuration can transparently affect even type A.1 applications.

Each component in the Component Model API can be individually configured. Applications type B.2 and the QoS Broker usually manage components configuration through the CC.

Concerning applications type B.3, the QoS Broker takes into account User Profiles information for configuring both component chains and lower-level entities (e.g. the QoS Signaling, network, and data link protocols).

The User's Profile information can be specified at high or low level of detail. In the former case, the QoS Broker shall perform QoS parameter mapping (i.e. translating user's high level requirements into a set of configuration parameters for each lower layer). In the latter case (expert mode), partial or even no QoS parameter mapping is required (depending on the expertise level of the user).

Users can also specify additional configuration information, also known as degradation paths. Each degradation path takes into account alternative QoS parameter configurations, to be used for addressing a given type of QoS violations in a pre-planned fashion.

In order to facilitate users specifying their profiles, templates containing reference configurations can be made available. The QoS Broker therefore relies on a User Profile Database.

A candidate implementation for User Profile description language could be QML Svend Frlund, Jari Koistinen, *QML: A Language for Quality of Service Specification,* Hewlett-Packard Laboratories Technical Report HPL-98-10 980210, Palo Alto, where QoS contracts are defined as associated to interfaces.

III. Adaptation Mechanisms

The following models are hereby proposed: Application Model and Communication Model. Individual adaptation mechanisms are described for each model. Aggregate adaptation mechanisms are finally presented at the end of this paragraph.

III.1 Application Model

This model focuses on the application lifecycle, with respect to local resources. Examples of resources are CPU, primary memory, network protocols, multimedia devices for each of the tasks that the application, as process, is composed of. Usage and QoS guarantees. As often pointed out in the literature, providing QoS in the network is not sufficient for guaranteeing that the users get the level of quality they ask (and pay) for.

Local resources are typically scarce in mobile computing devices like a PDA or a mobile phone. This scarcity can cause QoS degradation as soon as concurrent applications and/or simultaneous connections begin to compete for the limited amount of resources.

Basically one has to take into account that each new start of an application (thereinafter, an entry) may require the system to reshuffle-resources so as to accommodate the new entry.

Each application run has a specific importance for the system and, ultimately, for the user. For example, this concept can be mapped to priority and deadline in a real-time OS for each task belonging to the given application. Therefore, the reshuffle process shall take into account the importance of the new entry with respect to the importance of the already allocated ones. This and other information can be associated with an application through an application QoS contract. This invention does not describe explicitly the QoS Contract content. The scope of this invention is in fact to provide a framework upon which specific solutions can be built.

This process can be based on a set of aggregate importance classes. These classes range from a (cheap) no-QoS-assurance class, up to an (expensive) premium-QoS-enforcement class.

Each application is assigned a given class, and will be tentatively assigned resources, according to the class-specified level of QoS.

Should resources not be available at admission test, applications belonging to lower classes would be assigned fewer resources until the new entry can be accommodated. This fallback (The term fallback applied to this process must not be confused with the similar term used for designating backward the compatibility mechanisms indicated in Table 6.) process begins from the class immediately below the one of the given application, and eventually continues (Other applications, with a higher or equal class compared to the one of the new entry, may have already been degraded to the given lower class. In such a case, the new entry is not entitled to seize any resource allocated to those applications. If no spare resources are available for the current class and all the allocated applications have a higher or equal class compared to the one of the new entry, the fallback process must be iterated further to the immediately below class.) to lower classes, until resources are finally made available to the new entry.

The same process applies to each application that has been degraded to a lower class. Applications belonging to the lowest class can be eventually preempted by applications with a higher class. Therefore this fallback process features a cascade mechanism.

The fallback mechanism can be triggered also by hand over events (for more details see following paragraphs).

The user has the possibility to control the aforementioned fallback mechanisms, by providing an application degradation path in addition to the application QoS contract. Such information would steer the fallback mechanism the way the user prefers.

For no reason, an application of given class can affect other applications of higher or equal class. Class promotions (and demotions) of applications, based on user preferences, are however possible. Proper AAA mechanisms shall regulate such user's requests.

III.2 Communication Model

Let us consider now a given application that wishes to establish a communication channel with one or more peers. The term peer is hereby used in a broad sense, so as to include even asymmetric client-server scenarios. Each peer could be an application running either on the same, or on a remote-processing unit. Both cases can be addressed similarly, except that the latter deals with additional constraints concerning the usage of network infrastructure resources.

Generally speaking, applications can communicate with other peers within the high-level context of a session. As an example, a videoconference application would manage separately each conference in a session.

The session can then be broken into finer grained communication abstractions, the associations. Continuing the previous example, an association would represent a conference leg, i.e. the association between any two of the peers participating in said conference.

Finally, each association can be either mapped to a physical connection, or further decomposed in a set of information flows, or streams. This abstraction typically applies to multimedia applications.

Sessions, associations, and streams can be assigned each a QoS contract. The user can then pick up a specific configuration of the parameters indicated in template QoS contracts, and realize them into a corresponding set of QoS User Profiles (for more details, see § Adaptation Framework).

III.2.1 Session Establishment

The application can establish a session, provided that enough local and remote resources (Examples of session resources may be session priority, number of associated windows, estimated memory consumption for session control mechanisms.) are available. As an example, a small computing device may not support an unlimited number of sessions without running out of memory, or clogging up shared resources, like a display.

An adaptation mechanism similar to the one described in § Application Model can be applied to this phase as well.

Additionally, in order to check whether both peers are able to handle a given session, a negotiation process should take place. This invention proposes however a lazy approach: the session negotiation phase is deferred to the first association establishment (see § Association Establishment). This approach aims to reduce set-up time and network traffic. Please note that at session level, a negotiation process would be required for each peer participating in said session. Furthermore, the identity of said peers might not be known at session establishment phase.

In any case, the session has to deal with the coordination of session negotiation results originating from multiple association establishments: e.g. certain peers might not be able to manage a given session with the required QoS. The point is that each association might be either independent from-or tightly coupled to other associations. For instance: for the former case a videoconference, for the latter an online game or a distributed application. In the latter case, application-specific policies shall steer the overall negotiation process (e.g. suspend or even tear down the session, or simply degrade each association to a common QoS floor-level).

III.2.2 Association Establishment

This process translates into the establishment of one or more physical connections. Within a session, the application can establish an association, provided that enough local and remote resources, as well as network resources (This does not apply to the case of peers residing on the same computing unit.), are available.

1. admission test (CPU, multimedia devices, and primary memory): verifies whether enough resources are available locally. Similar
2. fallback mechanism: similar to the one described in § Adaptation Mechanisms, this mechanism is class-based.
3. negotiation: includes estimated protocol-(and, only for communication with remote peer, network-) resources usage, and a degradation path to be agreed upon. As indicated in § Session Establishment, session negotiation is included in this phase as well (during to the first physical connection establishment). This negotiation process takes also into account any eventual stream (Streams are assigned a QoS Contract as well as applications, sessions, and associations), which might be established within the given connection. If known a priori. For instance, a given association can be established with an audio, a video, and a data stream. This information is generally known at association establishment time.
4. QoS Signaling (only for communication with remote peer): once the two peers have come to a negotiation agreement, network resources can finally be requested, by using whatever QoS signaling mechanism is available (e.g. RSVP and/or DS marking).

The association establishment can be considered as subdivided into two phases: at first, best effort connectivity is used for establishing the association and performing negotiation. Subsequently, as soon as the parties have agreed upon a common set of QoS, resources are allocated correspondingly to the desired QoS level. A similar mechanism applies in reaction to QoS violations.

III.2.3 Stream Establishment

Streams can be eventually created during the lifetime of an association, upon user' requests or as a consequence of a recovery from a temporary service disruption (see § Runtime and Hand-Over). In such a case, the admission test, negotiation, and QoS signaling mechanisms described in § Association Establishment shall apply. With the exception that no session negotiation would be required.

III.2.4 Runtime and Hand-Over Events

Following are the mechanisms that shall be used for managing QoS and mobility aspects within the context of a session.

1. QoS monitoring
2. QoS enforcement
   2.1. flow management (policing, shaping, shaping, synchronization, etc)
   2.2. resource control (e.g. acting on the network/cpu scheduler)
   2.3. application reconfiguration (e.g. modifying component chains)
   2.4. renegotiation (e.g. as a consequence of a Hand-Over event)

To this extent, this invention introduces the following distinction: coordinated adaptation vs. control.

III.2.4.1 Coordinated Adaptation

Coordinated Adaptation is any mechanism, which allows peers to recover from sensible mutated conditions (QoS violations and/or changes in resources usage) in a coordinated manner. More specifically, this implies the necessity of performing renegotiations. Coordinated Adaptation can thus be regarded to as a horizontal process.

This invention introduces the concept of a renegotiation strategy (RS), based on degradation paths, that shall be agreed upon by peers at connection establishment time. The RS specifies a policy both peers shall follow when the conditions for renegotiations occur. Two policies can be identified:

Pre-planned sequence: based on the information describing the mutated conditions (e.g. a QoS violation), both peers know how to degrade to a lower class of QoS in a similar fashion. The renegotiation process is thus implicit. Consequently, no network traffic needs to be originated for managing this process.

Index-based renegotiation: the two peers can independently evaluate a lower QoS Class the given session should be degraded to. Renegotiation messages would be then exchanged, simply carrying the chosen set of references to the original degradation path items. This renegotiation process is thus explicit (i.e. requires some network traffic), but on the other hand the peers have more freedom in choosing the best degradation path for a given situation. For instance, fuzzy logic algorithms have been proven to be effective for reconfiguring QoS-related parameters in response to mutated conditions.

III.2.4.2 Control

Each peer shall take any possible action locally, in order to effectively and efficiently react to any mutated condition in the local computing unit and/or in the network, before ever relying on any specific adaptation mechanism. Control can thus be regarded to as a vertical process.

Given that the set of QoS parameters can be globally described as an element in a given n-dimensional space, the peer can use any control theory based mechanism, forcing said element to stay within a given region centered on the element.

This can translate for instance in the fallback mechanism described in § Application Model, and/or reconfiguring component chains (see § Runtime and Hand-Over Events).

III.3 Adaptation Framework

The overall adaptation framework is depicted in FIG. 1, by following Profile 5a–5d, Contract 6a–6d, and Contract Type 7a–7d concepts, as well as the extended UML graphical notation.

QoS Profiles 5a–5d specify the binding of a given QoS contract 6a–6d (which is problem domain-specific, but implementation-independent) with a given interface. In this case, the interfaces are QoS Management interfaces as supported by the application itself and/or by the middleware.

As partially indicated in the previous paragraphs, applications 1 may be required to perform session 2 coordination, sessions 2 may be required to coordinate associations 3, and associations 3 may need to synchronize streams 4.

This recursive dependency scheme reflects onto the various QoS Profiles 5a–5d. More specifically, metrics and policies will be needed: the former for specifying synchronization constraints (e.g. maximum tolerable lip-sync delay), the latter for indicating which type of actions should be taken when the synchronization is lost (e.g. automatically recover or ask user intervention).

FIG. 2 summarizes in a more organic manner the various mechanisms so far described, putting in evidence the distinction between coordinated adaptation and control mechanisms.

More specifically, the figure indicates that the fallback mechanism described in § Application Model applies not only to the Application 1, but also to the Session 2, Association 3, and Stream 4 abstractions. The reason is that each of the aforementioned abstractions uses local resources in various (implementation dependent) manners: e.g. session 2 may be associated to a certain number of tasks, each demanding some CPU and memory resources.

In order to be effective, the admission test and fallback mechanisms can thus be performed in a hierarchical manner, where at step n an estimated (or default) number of instances of the n+1 abstraction are taken into account. This distributed approach guarantees that resources are effectively committed only if a minimum, meaningful functionality can be offered to the user.

For instance, it would not make any sense to start a videoconference in a resource-constrained mobile device, if no resources are available for at least one connection.

This form of booking mechanism is also meant to speed up the establishment of connections.

IV. End System Reference Architecture

FIG. 3 provides a graphical representation of the application taxonomy presented in Table 4, with respect to existing protocols and the hereby-proposed middleware (see Table 7).

TABLE 7

Description of the Software Units and Components

| Unit Name | Unit Description |
|---|---|
| QoS Broker 8 | Component providing applications with the highest level of QoS awareness. The QoS Broker 8 basically manages any local and remote resource as a sort of OS extension. To this extent, all the applications running on a given end system will then be using and/or influenced (either indirectly-as in the case of applications type A.1 up to B.1-or directly) by such component. The QoS Broker 8 maps QoS parameters throughout the middleware, the protocol layers, the OS, and any multimedia component that might been used. The mapping is bi-directional, i.e. from User QoS Profiles down to low-level tunable firmware, and vice versa. Furthermore, the QoS Broker 8 implements the aforementioned adaptation mechanisms, delegating however low-level tasks to other specific components. The QoS Broker 8 offers applications with a high level QoS interface, thus enabling them to request services from lower layers, along with given high-level QoS User Profiles. In particular, the QoS Broker 8 manages the negotiation protocol described in § Proposal of a Standard QoS Negotiation Protocol. In order to be implementation independent, the QoS Broker 8 uses Session Manager component 11, which abstracts session level details (e.g. the use of H.323 protocols or SIP). In order to deal with QoS signaling, the QoS Broker 8 uses the Network Resource Booker component 9, which abstracts network resource reservation and allocation mechanisms (e.g. the use RSVP and/or DS in IP based solution). The QoS Broker 8 manages multimedia components (see below), by configuring component chains. Should adaptation been required, the QoS Broker shall reconfigure said chains and/or even substitute some components within the given chains. |
| Component Coordinator 10 | This software unit provides applications with a generic framework for managing components. More specifically, this unit 10 deals with component and component-chain lifecycle (deployment, activation, management, deactivation, and disposal). A component-chain can be managed as a whole by the Chain Coordinator component. During the deployment phase, this unit 10 can even download components from remote repositories (e.g. CORBA or Java Beans components). To this extent, this unit abstracts all the platform specific mechanism for locating and downloading said components. |
| Chain Coordinator 12 | This component 12 manages one or many component chains in order to guarantee flow synchronization within the tolerances requested by the user. Furthermore, this entity concentrates QoS events being generated by the monitors associated with each component, in order to provide the QoS Broker 8 with refined and concise information. |
| Session Manager 11 | This component 11 coordinates sessions and abstracts any session level detail (e.g. the use of H.323 protocols or SIP). The session manager 11 is responsible for the Session (see § Communication Model) establishment and management. In particular this component 11 shall report to the QoS Broker 8 any QoS violation signal, generated by the lower protocol layers, which might occur during the lifetime of a session (e.g. a Hand-Over event) . . . |
| Network Resource Booker 9 | This component 9 abstracts network resource reservation and allocation mechanisms (e.g. in IP based solution, a RSVP daemon and/or a DS marker). This component 9 can be used standalone for application types A.1, A.2 (by using QoS Signaling transparently to the application), and B.1. |
| CPU Manager 13 | Each instance of this component 13 manages CPU (local) resource usage for a given flow. More specifically, this component enforces flow-based QoS control mechanisms like flow policy, shaping, monitoring, etc. Monitors are put in evidence in FIG. 3. |

TABLE 7-continued

Description of the Software Units and Components

| Unit Name | Unit Description |
|---|---|
| Memory Manager 14 | Each instance of this component 14 manages primary memory (local) resource usage for a given flow. More specifically, this component enforces flow-based QoS control mechanisms like flow policy, shaping, monitoring, etc. Monitors are put in evidence in FIG. 3. |
| Multimedia Component 16 | Each component 16 consists of either self-contained software entities (like a QoS filter) or software drivers for a specific device (e.g. a frame grabber). Monitors are put in evidence in FIG. 3. |
| Network Protocol Manager 15 | Each instance of this component 15 manages network protocol (local) resource usage for a given flow. More specifically, this component 15 enforces flow-based QoS control mechanisms like flow policy, shaping, monitoring, etc. Monitors are put in evidence in FIG. 3. |
| CPU Resource Controller 17 | A per-computing-unit centralized software unit 17, offering the aforementioned CPU Managers with fine CPU control and monitor. This unit 17 is platform dependent, but communicates with said managers through a platform independent interface. More specifically, this unit allows CPU scheduler management (e.g. changing quanta and/or deadlines assigned to each task). |
| Memory Controller 18 | A per-computing-unit centralized software unit 18, offering the aforementioned Memory Managers 14 with fine CPU control and monitor. This unit 18 is platform dependent, but communicates with said managers through a platform independent interface. More specifically, this unit allows fine primary memory management (e.g. MMU management). |
| Multimedia Controller 20 | A per-computing-unit centralized software unit, offering those Multimedia Components 16 that deal with a specific hardware multimedia device, with fine device control and monitor. This unit is platform dependent, but communicates with said managers through a platform independent interface. |
| Network Protocol Controller 19 | A per-computing-unit centralized software unit 19, offering the aforementioned Network Protocol Managers 15 with fine control and monitor mechanisms over the protocol stack. This unit 19 is platform dependent, but communicates with said managers through a platform independent interface. More specifically, this unit allows fine lacal network resources management (e.g. packet buffer size or packet scheduling management). This unit can be interfaced to a data link/physical protocol layers manager unit, in order to allow fine parameter tuning and control over said protocol layers from within the QoS management plane. To this extent, the QoS and Mobility Enabled Transport interface indicated in FIG. 3 would then redirect QoS-related information/operation to the QoS Management plane and, through the Network Protocol Controller, to the data link/physical protocol layers manager unit. This unit is not explicitly indicated in FIG. 3. It is envisioned that the interface between the Network Protocol Controller and the data link/physical protocol layers manager unit will be standardized in the next future. |

V. The Proposed QoS Adaptation Framework from an OSI Perspective

The purpose of this paragraph is not to rigorously map the hereby-presented framework to the full-blown OSI architecture, rather to indicate the analogies between the concepts presented so far, and some key aspects of the OSI model.

Purpose of the OSI standard is to define the information exchange among open systems. Systems that can freely cooperate in order to achieve a common objective. Key aspects of open systems are interoperability and application portability. To this extent, open systems negotiate a set of common functionality so that they can share a common view of each other, thus hiding any internal characteristic peculiar of each system.

As background information, following please find briefly summarized some OSI concepts concerning with the Application, Presentation, and Session Layers, with the focus being only on those aspects, which the author considers as essential for formalizing this invention.

V.1 The Application Layer in the OSI Model—Background Information

FIG. 4 presents a high level view of the OSI Application Layer. This layer is the topmost one in the 7-layer OSI architecture. As such, this layer offers a service directly to the final user, i.e. the Application Process (AP). The Application Process 20 is actually outside the scope of the OSI: within the OSI model, an Application Process is represented by an Application Entity 21 (AE). An AE 21 is defined as a set of:

A User Element 22 (UE), which represents the AP 20 to the AE 21, therefore being the joining element between the real system and its representation as open system.

A collection of logically correlated Application Service Elements 23, 24 (ASE) each defined as a functional module.

The OSI Application Layer thus provides said AEs with functionality for supporting communication at Application Process level. This functionality is carried out through protocols designed for specific applications and/or general-purpose routines.

The AE nature is determined by the choice of the ASEs being used. These elements can not exist by themselves. Therefore, an application entity is composed of one or more ASEs, each accomplishing a specific task on behalf of the user application. As a consequence, the architecture of the application service differs considerably from the architecture of the other OSI layers; in fact, the latter can be represented by an entity that offers a particular service, while the application layer can be represented through the set of ASEs and negotiable options.

More specifically, each Application is characterized by a set of Specific ASEs (SASE), ad hoc defined and offering functionality that are typical of the application they have been designed for (e.g. FTAM manages file transfer functionality).

Furthermore, any functionality that is common to multiple types of applications can been abstracted out. The corresponding ASEs are called Common ASE (CASE). In particular, any ASE offering services to another ASE can be considered as a CASE.

From a procedural perspective the cooperation among application processes takes place thorough logical bounds, called Application Association, established between each couple of AE residing in different processing units. The AE originating an association is called Association Initiator, whereas the other peer is called Association Responder. Therefore, an Application Association is the relationship between two AEs, and offers the required reference structure for allowing them to cooperate.

The procedures for establishing associations include the exchange of proper Application Protocol Data Units (APDU), by using the services offered by the OSI Presentation Layer. Said APDUs also conveys control information, which the AEs can use for managing the Application Association and coordinating their functionality.

For each Application Association, the way information is exchanged needs to be defined: to this extent, the set of procedures used between the AEs is called the Application Context of the given Application Association. An Application Context is whatever type of information AEs require for cooperating over a given Application Association. In particular, said context would always include the description of the set of ASEs used by each AE involved in said association.

To this extent, in order to ease the definition of processes that concur in setting up the communication between AEs, some abstract models have been identified, each logically grouping functionality that have already been defined for a given Application Context. The Single Association Object (SAO) is the abstract model of the functions corresponding to a specific application association. It is composed of one or more ASEs, among those belonging to the given AE.

Since the ASEs belonging to a SAO are those that are part of the Application Association represented by the SAO, one of them must be the Application Control Service Element (ACSE). This ASE deals with the establishment, release, and abort of Applications Associations.

Within each SAO one can identify the procedures that regulate the interactions among ASEs, and those which regulate the interactions among said ASEs and the OSI Presentation Layer. The Single Association Control Function (SACF) is the abstract model that identifies the set of said procedures; it represents the execution of rules defined within the application context, and therefore its description is implicitly contained within the Application Context and, in particular, in the ASEs descriptions.

If the Application Entity opens more associations, multiple SAOs can be correspondingly identified. These SAOs can feature different combinations of ASEs. A Multiple Association Control Function (MACF) can be used if some form of coordination is required among some or all the Application Association of a given AE. Substantially, the MACF governs le interactions among a group of SAOs within a given AE, over some associations. That is, the temporal sequence of events within the various associations, the relationships among them, and everything that could be useful for the management of a multiple association.

FIG. 5 depicts the use of AEs (i.e. Application Entity Invocations); it shows two Application Associations, one between two instances of SAO 1 and the other between two instances of SAO 2. In both cases, the MACF controls the use of services offered by SAO 1 and SAO 2 in AEI 2. Even though not indicated in the figure, direct associations without the mediation of any MACF are of course also possible.

Examples of ASEs are:

ACSE (Association Control Service Element): deals with the establishment, release, and abort of Applications Associations.

FTAM (File Transfer Access and Management): deals with file transfer functionality in the OSI context. Historically, this has been one of the first ASEs ever developed, and it is one of the most interesting applications.

RTSE (Reliable Transfer Service Element): offers the procedural elements for the reliable transfer of information. This functionality mirrors the OSI Session Layer one, but offers the possibility of using ASN.1 rather than byte formats thus simplifying the complexity of the Session Layer.

ROSE (Remote Operation Service Element): allows the support of event those distributed applications, which are not strictly based on the client-server model.

CCR (Commitment Concurrency Recovery control): designed for managing distributed applications, by solving consistency and concurrency problems that might occur in such cases.

CMISE (Common Management Information Service Element) and SMASE (System Management Application Service Element): they both deal with network management in the OSI context. Both rely on ROSE.

V.2 The Presentation Layer in the OSI Model—Background Information

The OSI Presentation Layer establishes, manages, and terminates communication sessions between OSI Application Layer entities. The OSI Presentation Layer main purpose is to render virtual any syntactical difference (Whereas the OSI Application Layer main purpose is to render virtual any semantic difference among applications in an open system. This means to ensure that said applications share a common dialogue context, that is what to discuss about and how to do that. A common semantic implies the use of a common syntax.), which might exist among the various applications cooperating in an open system context. Another key feature of this Layer is data encryption, which is, however, outside the scope of this writing. Encryption can be accomplished theoretically in any of the seven OSI layers, but actually only the Physical, the Session and the Presentation Layers are considered by some authors as the most suitable ones. This goal can be achieved by either using common transfer syntax, or a common external representation of data.

The concrete data structures in the local syntax are mapped to data types, which describe them in terms of an Abstract Syntax. An example of Abstract Syntax is the ASN.1 standard. A Transfer Syntax is then applied to the Abstract Syntax, in order to obtain the value corresponding to a given abstract data type (serialization).

The couple (Abstract Syntax, Transfer Syntax) is called Presentation Context, which is defined by the Presentation Layer for implementing its functionality. Actually, this Layer supports two types of contexts:

A Defined Context, which is the one agreed upon among the two users and the Presentation Layers, through a negotiation process.

A Default Context, which is always available at the Presentation Layer. This context is used if the Defined Context has not been agreed upon.

In order to expedite the negotiation process, each Presentation Context is assigned a Presentation Context Identifier (PCI), an integer value that can be used for later referencing a specific context.

For instance, an AE can be composed of two ASEs. Each ASE may define its own abstract syntax for communicating with the peer ASE. Generally, these abstract syntaxes can differ. In order to avoid confusion, two distinct Presentation Contexts, one per ASE pair, are set up during the presentation connection establishment. This distinction is achieved by marking each context with a specific PCI.

The Presentation Layer mandates a set of services and protocols dealing, among other functionality, with the Presentation Context negotiation (at presentation connection establishment time) and renegotiation (during the connection lifetime) process.

At connection establishment time, a Defined Context Set (DCS) is negotiated. The Initiator first specifies in said DCS a list of all the Presentation Contexts that it can handle. For each context, the PCI and the Abstract Syntax are specified. The Initiator does not specify anything concerning with the Transfer Syntax. The OSI Presentation Layer, used by the Initiator, in fact provides this information. The presentation entity adds all the possible Transfer Syntaxes that are compatible with a given Abstract Syntax listed in the DCS.

If no Transfer Syntaxes are available for a given Abstract Syntax, an exception is raised to the application process, and the corresponding item is removed from the DCS.

The complete DCS information is then sent to the peer OSI Presentation Layer, which checks whether the specified Transfer Syntaxes can be supported, and then forwards to the local user (the Responder) the following information for each Presentation Context listed in the DCS:

PCI

Abstract Syntax

A flag indicating whether a particular Presentation Context has been accepted or not (acceptance or provider rejection).

Should a given context be rejected, one of the following reasons are specified:

Unspecified Reason

Unsupported Abstract Syntax

None of the proposed Transfer Syntax has been accepted

Reached DCS Local Limit

The Responder then replies to its presentation service provider, which Presentation Context the Responder is able to support. The Presentation Layer communicated this information back to the originator peer, in terms of:

PCI

Abstract Syntax

Flag: acceptance/provider rejection indicator

The chosen (unique) Transfer Syntax

This information is forwarded to the Initiator and the negotiation is over. The DCS contains now only those Presentation Contexts (each with its own unique Transfer Syntax) that both peers can support.

This process can be repeated at any time, during the lifetime of a presentation connection.

V.3 The Session Layer in the OSI Model—Background Information

The OSI Session Layer establishes, manages, and terminates communication sessions between OSI Presentation Layer entities. More specifically, the Session Layer main purpose is to structure and regulate the data flow among users, managing any failure and/or exceptional event that might occur. In order to deal with the latter aspects, the session service relies on the checkpoint concept. A checkpoint is a logical mark inserted during the lifetime of a connection between two users. When a failure/exception occurs, provisions are made available for recovering from the given event by rolling back to one of the connection states marked with a checkpoint.

The OSI Session Layer can map session connections to transport connections (offered by the underlying OSI Transport Layer) in different ways: one-to-one correspondence, one session connection over multiple transport connections, multiple session connections over one transport connection. Transport connections can be reused for multiple session connections, or new ones can be established for given session connections. This transport connection assignment is based on the users' QoS requirements.

V.4 A Formal Description of the Proposed QoS Adaptation Framework

FIG. 6 presents the QoS Adaptation Framework described in § Adaptation Framework, conforming to the OSI concepts indicated in § The Application Layer in the OSI Model—Background Information, The Presentation Layer in the OSI Model—Background Information, and The Session Layer in the OSI Model—Background Information. The following formal description refers to the full-fledged middleware supporting application type B.3. The same concepts can be applied, mutanda mutandis, to the application types B.1 and B.2.

The QoS Broker 30 (i) implements the main QoS adaptation logic and (ii) coordinates the various entities (e.g. the management of applications; the coordination of associations, sessions, and streams). The QoS Broker is a component itself and as such, a central Component Coordinator SW Unit manages it. This Unit manages also all the other components that fit into the architecture. More specifically, the QoS Broker 30 relies on an external component, the NRB 31, which however users can otherwise directly access through a specific GUI (this applies to any type of applications—with only some limitations for applications type A.1 and A.2, where no QoS signaling is available, but QoS configuration is allowed).

The Application Process 32 (AP) represents the user application. The AP 32 can use the middleware, but the middleware only indirectly affects it. The middleware in fact performs QoS adaptation by tuning the AP resource usage, as described in § Application Model. To this extent, the AP 32 is associated with an AE instance 33 (AEI). The association is actually realized through an UE 34, which represents the AP 32 within the middleware. The UE 34 contains information concerning the AP 32, like priority, class (see § Application Model), and (if any) configuration information (for instance some memory requirements) that might be useful for performing admission test and the fallback mechanisms. The UE 34 also coordinates a list of open sessions (for the sake of simplicity, the figure represents only one session), under QoS Broker 30 direct control.

Each session, as described in § Communication Model, can be split in several associations. The set of said associations is coordinated by the Session Manager 35, which therefore acts as a MACF, under QoS Broker direct control.

Each association is represented by a SAO 36, 37: the Chain Coordinator 38 (see § Adaptation Framework) acts as a SACF, by coordinating ASEs (like multimedia components and Resource Managers—see § End System Reference Architecture), under QoS Broker direct control. More specifically, the Chain Coordinator 38 handles multiple chains each eventually associated with a given stream. To this extent, ASEs are instantiated per stream. Furthermore, certain components can be implemented as stubs, which represent a high level interface of the given components. This level of indirection introduces polymorphism property in the architecture: the actual component implementations (skeletons) are typically handled within the OSI Presentation Layer as a sort of component skeleton library. In most of the cases, in fact, multimedia components deal with typical OSI Presentation issues, like e.g. encoding, compression, and encryption functionality. On the other hand, multimedia components that cannot be modeled in this way are e.g. those which deal with multimedia device drivers. Which skeleton will be actually used, depends on the result of an extended Presentation Context negotiation process, as described below.

To this extent, the present invention slightly differs from the OSI model: the QoS information is negotiated beforehand at the highest layers, and only later communicated to the OSI Transport and lower layers, in terms of negotiated QoS requirements specific to the physical connections that have to established.

Being implicitly included in the OS context, the Resource Controllers are therefore not indicated in FIG. 6 for simplicity reasons.

V.4.1 Extended Presentation Context Negotiation Process

The idea is to leverage the existing Presentation Context Negotiation Process for exchanging additional context information among peers. More specifically, in addition to the Abstract Syntax (which might in certain cases do not even apply—the OSI model is hereby used only as a reference model, and not all of its concepts are hereby enforced), the peers now will exchange QoS information, in terms of:

List of component stubs to be used

Application QoS Profile

Session QoS Profile (if any session is to be used, assumes one session will be used by default)

Association QoS Profile (assumes one association will be used by default)

Stream QoS Profile (if any stream is to be used, assumes one stream will be used by default)

The Association and Stream QoS Profiles contain estimated information concerning protocol stack resource usage. These estimates are computed through the Resource Managers dedicated to each flow and resource type, in conjunction with the centralized services offered by the resource controllers. QoS Brokers shall then tune these estimates during the runtime, using the adaptation mechanisms described in § Adaptation Mechanisms.

The ASE information is organized in a DCS: a PCI, an Abstract Syntax (if any required), and a Component Stub (if any needed) are assigned to each ASE that needs to establish a communication with a peer one. For instance, the initiator may choose to use a data compressor with a given compression ratio: given that the two peers may have various brands/flavors of compressors. These compressors might even be not fully compatible with respect to each other. Therefore, the peers need to agree (i.e. negotiate) upon which actual compressors (i.e. Skeletons) they shall use. Being simply piggybacked by QoS Presentation Layer protocol data units, the QoS Profiles are placed in front of the DCS. In order to correlate session, associations, and streams, each Profile is associated with an identifier, as indicated in FIG. 7.

For the sake of simplicity, this figure represents the specific case of one session, one association, one stream, and one ASE description. More generally, each of these descriptions can be replicated according to the actual entities been active, so as to group negotiation information in one data structure. This typically applies to ASEs, but can be extended as well to the other abstractions.

The Presentation Layer serving the Initiator shall complete the negotiation information to be sent to the peer, by selecting from the libraries the Transfer Syntaxes (see § The Presentation Layer in the OSI Model—Background Information) and the Component Skeletons that comply respectively to the specified Abstract Syntax and Component Stubs.

At the peer side, the OSI Presentation Layer shall validate the Transfer Syntaxes (if any) and Component Skeletons (if any), and relay the resulting information to the Responder. The Responder is shepherded by the peer QoS Broker: admission test and fallback mechanisms (see § Application Model) are performed at the various layers (including the lower layers), and a response is handed back over the Initiator accordingly. This scheme is based on the same mechanisms described in § The Presentation Layer in the OSI Model—Background Information.

The negotiation process can be repeated in case the Initiator is not satisfied with the Responder feedback. In every step, the resources are allocated along the path, as indicated in FIG. 9 (see § Proposal of a Standard QoS Negotiation Protocol for a detailed description of this figure).

The same mechanisms can be applied to the renegotiation process, the main difference being that the communication links among peers are already established.

What presented so far reflects an ideal world case, where a specified set of QoS requirements can be specified once forever, and the QoS Brokers are able to satisfy said requirements by simply tuning the overall systems in a coordinated manner.

In the real world, however, sudden QoS violations can be so dramatically big to drive the QoS Brokers offset. In such a case, proper degradation path information (see § Adaptation Mechanisms) shall be included in the negotiation information. This additional information can be structured as additional sets of information, in the same way as indicated in FIG. 7 (which represents the reference context). In order to distinguish items belonging to the degradation path from the ones belonging to the reference context, each item (the description in FIG. 7) shall assigned an ID, mathematically correlated with the corresponding item in the reference context. The mathematical relationship could be a proper hierarchical bit mapping scheme, or any other solution. This invention does not mandate any specific relationship, as this is seen to be an implementation dependent issue. FIG. 8 presents a sample case of degradation information applied to the negotiation information.

As indicated in § Adaptation Mechanisms, the renegotiations can thus be limited to a simple item ID exchange, and only when the two QoS Brokers do need to synchronize. By default, in fact, the QoS Brokers are assumed to be able to use degradation path information at the unison. Only if, after a configurable timer has expired, the monitored QoS is still violating the (degraded) QoS requirements, the QoS Brokers initiate a renegotiation process, where only the sets of chosen items IDs are negotiated (given that the corresponding information has already been negotiated at connection establishment time).

Only in the case one of the peers has got corrupted the previously negotiated information, or whenever the user has modified her/his configuration information, an explicit renegotiation process (similar to the one described for the reference negotiation case) shall apply. A QoS Broker receiving such an explicit request shall automatically be forced to discard previous information and complete the renegotiation process, as if it was a new negotiation process.

V.4.2 A Final Note About The OSI Presentation Layer

So far the proposed QoS Adaptation Framework has been described with respect to an OSI Presentation Layer, with augmented negotiation capabilities. This concept has been introduced for formalizing said framework, according (to a certain extent) to the OSI model.

From an implementation point of view, however, the OSI Presentation Layer functionality is partly included in COTS Session protocol implementations (like SIP) and partially in the QoS Broker Component. More specifically, the QoS Broker Component can be thought of as composed of a set of four major components:

QoS Profiles Database Management System

QoS Parameters Mapper

QoS Control/Coordinated Adaptation Finite State Machines

QoS (re)Negotiation Engine

The latter component is dealing with all the logic behind the negotiation process, whereas session protocols like SIP can be used for implementing the negotiation protocol.

V.4.3 User Interaction

The negotiation process has been described so far as a completely automatic mechanism. Indeed, the QoS Broker offers a high level of automation. Nevertheless, the Responder can agree with the Initiator upon establishing any given session, association, and stream, provided that human control is exerted at some level.

The Responder could in fact be an instance of configured automata (i.e. a Video on Demand server), or just a human picking up a call (e.g. a videoconference application). Even in the latter case, however, the user can program the QoS Broker to take into account details (such as QoS related issues), thus being able to take high level decision (accept I reject / modify the call request).

VI. Proposal of a Standard QoS Negotiation Protocol

This invention proposes the standardization of a generic QoS Negotiation Protocol: this protocol is not tight to any particular network technology. Actually, rather than proposing yet a new full blown protocol, this invention describes a meta-protocol, which can be implemented by mapping the procedures and the information elements described below, to existing protocols like, e.g., SIP.

To this extent, generic logical messages (thereinafter indicated as methods), like ADZ association establishment, stream establishment, acknowledgements, and renegotiation, are widely used in order to represent the negotiation signaling between the peers, which is therefore performed in-band.

These generic messages shall be mapped to the protocol specific analogous messages. Provided that the selected protocol specification allows extensibility features. Otherwise, proper actions shall be taken within the proper standardization bodies in order to explicitly support the information elements hereby-described. The important aspect of this invention is that real-protocol messages piggyback the negotiation information (including degradation paths), along with the usual information. This lazy approach implies that no explicit negotiation messages are required whatsoever, thus reducing the complexity of the protocols and the setup (or recovery, as in the case of renegotiations) delay.

Furthermore, simple end-to-end scenarios are hereby described: the use of intermediate network entities (like proxy servers, gateways, etc.) is implementation specific and does not alter the scope of the meta-protocol. Actually, one of the peers could eventually be a QoS Broker embedded within the network (case of active networks).

VI.1 Sample Scenarios

FIG. 9 presents the three most important scenarios: association establishment, stream establishment, and renegotiation (in this case, due to a Hand-Over event).

The session establishment scenario is illustrated in said figure, with respect to the peer B (which, in these scenarios, acts as the callee). As for what peer A (the caller) concerns, the session may have already been established during a previous association establishment with another peer. Nevertheless, as described in § Session Establishment, during each association establishment, session negotiation is performed with respect to the new session participant, by piggybacking Session QoS Profile information.

Furthermore, during the association establishment phase, session level degradation path information is piggybacked as well.

In any case, the acknowledgement messages indicate the results of the negotiation process from the callee perspective. If the caller agrees on such results, resources are finally allocated, otherwise corrective actions (which might include interaction with the user) can be taken, in order to reformulate a new bid, by using the same message exchanged in the renegotiation case. For simplicity reasons, the latter case is not indicated in said figure.

The following tables describe in detail the methods and the bits they are made of. The notation used is based on the decomposition of methods into information elements, each describing a particular aspect of the negotiation information. Information elements are then further decomposed into tokens, each describing the lowest level of information. Tokens can be used by multiple information elements, as well as the latter can be mapped to multiple methods. The "m" symbol indicates a mandatory element. The "o" symbol indicates an optional element. In particular, degradation path information is modeled as additional information elements appended to the reference ones, and linked to the corresponding reference information element as described in § Extended Presentation Context Negotiation Process and depicted in FIG. 8.

TABLE 8

Tokens

| Name | Description |
| --- | --- |
| Length | Length of the information element in number of bytes, this token exclusive |
| Session ID | Globally identifies a session among peers |
| Association ID | Identifies an association within a given session (cf. SIP Call-ID) |
| Stream ID | Identifies a stream within a given association |
| PCI | Identifies the (ASE-related) Presentation Context |
| Abstract Syntax Name | Identifies the Abstract Syntax |
| Transfer Syntax Name | Identifies the Transfer Syntax |
| Component Stub Name | Identifies the Multimedia Component Stub |
| Component Skeleton Name | Identifies the Multimedia Component Implementation (Skeleton) |
| Stream QoS Profile | Stream level QoS Profile, described in QML notation |
| Association QoS Profile | Association level QoS Profile, described in QML notation |
| Session QoS Profile | Session level QoS Profile, described in QML notation |
| Application QoS Profile | Application level QoS Profile, described in QML notation |
| Result | Bitmap indicating the negotiation results: a set of acceptance/provider rejection indicator flags |

TABLE 9

Information Elements Description

| Name | Description |
| --- | --- |
| ASE Description | Describes the Presentation Context, augmented with information about any Multimedia Component that might be used by the peers. |
| Stream Description | Describes the stream-related QoS information |
| Association Description | Describes the association-related QoS information |
| Session Description | Describes the session-related QoS information |
| Application Description | Describes the application-related QoS information |
| Negotiation Result | Describes the result of the negotiation process |

TABLE 10

Information Elements Structure

| | Length | Session ID | Association ID | Stream ID | PCI | Abstract Syntax Name | Transfer Syntax Name | Component Stub Name | Component Skeleton Name | Stream Qos Profile | Association Qos Profile | Session Qos Profile | Application Qos Profile | Result |
|---|---|---|---|---|---|---|---|---|---|---|---|---|---|---|
| ASE Description | m | | | | m | o | o | o | o | | | | | |
| Stream Description | m | | | m | | | | | | m | | | | |
| Association Description | m | | m | | | | | | | | m | | | |
| Session Description | m | m | | | | | | | | | | m | | |
| Application Description | m | | | | | | | | | | | | m | |
| Result | m | | | | | | | | | | | | | m |

TABLE 11

Methods Description

| Method Name | Description |
|---|---|
| Association Establishment | Used by the Initiator for negotiating with the Responder the establishment of the given association (and, implicitly, the underlying session), with given QoS. |
| Stream Establishment | Used by either peer for establishing a new information flow within the given association |
| Renegotiation | Used by the Initiator for negotiating with the Responder a degradation path for the given association (and, implicitly, the underlying session), given a QoS violation. |
| Acknowledgement | Reports the result of a (re)negotiation back from the Responder to the Initiator |

| | ASE Description | Stream Description | Association Description | Session Description | Application Description | Result |
|---|---|---|---|---|---|---|
| Association Establishment | m | o | m | m | m | |
| Stream Establishment | m | m | m | m | m | |
| Renegotiation | m | o | m | m | m | |
| Acknowledgement | m | m | m | m | m | m |

The main advantageous differences between the invention and the state of the art

| P_ID | Key Aspect | Description |
|---|---|---|
| 1 | Interoperability | Backward compatibility mechanism (see Table 6) Can operate with compatible QoS proxy disseminated in tree topologies within the network |
| 2 | Modularity | QoS Broker, NRB, Session Manager, Component Chain Coordinator, and Resource Managers are all components themselves. |
| 3 | Configurability | NRB can be used for configuring the protocol stack and use any kind of QoS signaling mechanisms Multimedia Components Skeletons offer multiple implementations of a given contract (Multimedia Component Stub), which can be negotiated |

-continued

| P_ID | Key Aspect | Description |
|---|---|---|
| | | as well as Transfer Syntaxes and other OSI Presentation Layer-related issues. |
| 4 | Adaptability | Aggregate Resource Class concept: similar to DiffServ aggregate traffic, but applied to computing unit reosurces. Fallback mechanism Piggyback of negotiation information Piggyback and pre-negotiation of degradation paths Distributed fallback mechanism with booking mechanism |
| 5 | Standardization | Formalized as an OSI-like model (differences are the enhancements offered by this invention): more specifically, the hereby-proposed framework focuses on QoS management at a functional level (application, session, association, and stream) level, rather at a structural level (QoS management across protocol stack layers). The former is mapped to the latter by the QoS broker, but is an implementation detail. Therefore the proposed framework is general enough to take into account any type of applications that require QoS guarantees (e.g. this framework can deal also with standalone applications, or applications using inter-processor-communication facilities offered by the Operating System for local communication). Standard generic solution (meta-protocol) Implementation independent |

EXAMPLE

The proposed negotiation protocol can be implemented in the IP world, cast over the Session Initiation Protocol specified by the Internet Engineering Task Force. The procedures, methods, information elements, and tokens described in the previous sections can be in such a case mapped to SIP procedures and methods, modeled according to the SIP text-based message syntax.

For instance, a possible implementation could be based on the following mapping:

| Method | SIP Method | Notes |
|---|---|---|
| Association Establishment | INVITE | Negotiation done during invitation |
| Stream Establishment | INFO | At the time of this writing, the SIP INFO method is still in an IETF draft state. Among other uses, this method is being used in HMPP for smoothly managing Hand-Over events. |
| Renegotiation | INFO | At the time of this writing, the SIP INFO method is still in an IETF draft state. Among other uses, this method is being used in HMPP for smoothly managing Hand-Over events. |
| Acknowledgement | 200 OK, INFO | Returning negotiation results to the Initiator, as a result of an invitation. In response to an INFO method, another INFO method shall be used. |

This invention provides the framework for future implementation-specific inventions in the area of application QoS adaptation, especially for mobile and multimedia applications.

Table 13 captures the most meaningful aspects of this invention, putting in evidence the original ideas being hereby claimed.

TABLE 13

Detailed list of the original features of this invention

| P_ID | Key Aspect | Original Features to be claimed |
|---|---|---|
| 1 | Interoperability | The failback mechanisms described in Table 6 for providing backward compatibility between the various types of applications described in Table 4. |
| 2 | Modularity | The modular approach for addressing the various types of applications (described in Table 4): the staircase FIG. 2. The component-based model applied to both the High-Level QoS API and the Component Model API. See § Modularity. |
| 3 | Configurability | The proposed framework is general enough to be accommodated on any given network model and QoS signaling protocol. More specifically, the integration of the following SW units, which mask implementation details to the QoS middleware and the applications, as described in § Configurability: Network Resource Booker (NRB): abstracts out network resource reservation mechanisms. It can be directly used by humans (through a proper GUI), or use by the QoS Broker (see FIG. 3). Session Manager: coordinates multiple peer to peer associations within a session, and abstracts out session protocols. Network Protocol Resource Controller: abstracts out network protocol stack management (e.g. control of queue scheduler and/or data-link/physical protocol layer resources - through a specific data-link/physical protocol layer manager unit) Memory Resource Controller: abstracts out primary and secondary memory management CPU Resource Controller: abstracts out CPU management (e.g. control over the task scheduler) Multimedia Device Drivers: abstracts out multimedia device details See § Configurability |
| 4 | Adaptability | The application and communication models, along with their specific adaptation mechanisms, organized in a framework. These models are rigorously described in terms of the ISO OSI architecture, and form the logical framework for molding the QoS (re)negotiation process in the most general manner. The High-Level QoS API and the Component Model API. See § Adaptation Mechanisms. |
| 5 | Standardization | Methods for achieving platform- and network-neutral negotiation and re-negotiation protocols, by extensively using piggyback mechanisms and pre-negotiated degradation paths. These results being obtained by introducing the concept of (re)negotiation process as an extension of the ISO OSI Presentation Negotiation Protocol. See § Proposal of an Standard QoS Negotiation Protocol. A SIP binding is offered as an example. This binding to be standardized through the IETF standardization body. See § Example. |

More specifically, with respect to the FIG. 3, this invention proposes an end-terminal QoS middleware architecture.

Table 14 indicates the dependencies among the SW Units building up said middleware. For a more detailed description of each of these units, please refer to the corresponding entry in Table 14.

TABLE 14

List of SW Units

| SW Unit Name | Dependencies |
|---|---|
| QoS Broker | Component lifecycle managed through the Component Coordinator. Coordinates the following units directly: Network Resource Booker Session Manager Coordinates the following units through Chain Coordinators: CPU Manager, Memory Manager, Multimedia Component, Network Protocol Manager, along with their corresponding monitors. |
| Component Coordinator | Manages lifecycles of the following units: QoS Broker, Chain Coordinator, Session Manager, Network Resource Booker, CPU Manager, Memory Manager, Multimedia Component, Network Protocol Manager, |

TABLE 14-continued

List of SW Units

| SW Unit Name | Dependencies |
| --- | --- |
| Chain Coordinator | Component lifecycle managed through the Component Coordinator and the QoS Broker. Coordinates the following units:<br>CPU Manager,<br>Memory Manager,<br>Multimedia Component,<br>Network Protocol Manager, |
| Session Manager | Component lifecycle managed through the Component Coordinator and the QoS Broker. This Unit offers a unified API with respect to existing session layer protocols, like e.g. SIP or H.323. |
| Network Resource Booker | Component lifecycle managed through the Component Coordinator and the QoS Broker. Additionally, this unit can be coupled with a GUI, to provide direct human access to its core functionality. This Unit offers a unified API with respect to existing resource reservation protocols/mechanisms, like e.g. IntServ and/or DiffServ. |
| CPU Manager | Component lifecycle managed through the Component Coordinator and the Chain Coordinator. Associated with a monitor sub-unit, which reports filtered events to said Chain Coordinator. One instance of this unit (and the corresponding monitor sub-unit) is associated with each stream. This unit uses the CPU Resource Controller for getting/changing resource global status information. |
| Memory Manager | Component lifecycle managed through the Component Coordinator and the Chain Coordinator. Associated with a monitor sub-unit, which reports filtered events to said Chain Coordinator. One instance of this unit (and the corresponding monitor sub-unit) is associated with each stream. This unit uses the Memory Controller for getting/changing resource global status information. |
| Multimedia Component | Component lifecycle managed through the Component Coordinator and the Chain Coordinator. Associated with a monitor sub-unit, which reports filtered events to said Chain Coordinator. One or more instances of this unit (and the corresponding monitor sub-unit) is associated with each stream. This unit uses the Multimedia Controller for getting/changing resource global status information. |
| Network Protocol Manager | Component lifecycle managed through the Component Coordinator and the Chain Coordinator. Associated with a monitor sub-unit, which reports filtered events to said Chain Coordinator. One instance of this unit (and the corresponding monitor sub-unit) is associated with each stream. This unit uses the Network Protocol Controller for getting/changing resource global status information. |
| CPU Resource Controller | Unit providing fine-grained access/control to CPU resource global status. This unit can be embedded into the OS. Used by CPU Managers. |
| Memory Controller | Unit providing fine-grained access/control to Memory resource global status. This unit can be embedded into the OS. Used by Memory Managers. |
| Multimedia Controller | Unit providing fine-grained access/control to Multimedia resources global status. This unit can be embedded into the OS. Used by Multimedia Components. |
| Network Protocol Controller | Unit providing fine-grained access/control to Network Protocol resource global status. This unit can be embedded into the OS. Used by Network Protocol Managers. This unit can be interfaced to a data link/physical protocol layers managing unit, in order to allow fine parameter tuning and control over said protocol layers from within the QoS management plane. To this extent, the QoS and Mobility Enabled Transport interface indicated in FIG. 3 would then redirect QoS-related information/operation to the QoS Management plane and, through the Network Protocol Controller, to the data link/physical protocol layers manager unit. This unit is not explicitly indicated in FIG. 3. It is envisioned that the interface between the Network Protocol Controller and the data link/physical protocol layers manager unit will be standardized in the next future. |

The invention claimed is:

1. A wireless mobile device for communication in a wireless communication network, said wireless mobile device comprising:
   a processing system with a component coordinator unit for providing applications of the wireless mobile device with a generic platform and network-independent framework that uses a platform and network-neutral set of application adaptation mechanisms, including a Qos negotiation and re-negotiation protocol; and
   a Qos broker unit being managed by the component coordinator unit and coordinating management of resources of the wireless mobile device and of remote resources by using said negotiation and re-negotiation protocol,
   wherein the wireless mobile device is a resource constrained wireless mobile unit having no additional support from the network.

2. The processing system according to claim 1, wherein said protocol uses piggyback mechanisms for Qos negotiating and re-negotiating.

3. The processing system according to claim 1, wherein said generic framework addresses different types of applications including existing applications and applications that rely on middleware.

4. The processing system according to claim 1, wherein said generic framework is based on an application model in which each application is allocated to one of a set of application classes having different QoS level with respect to resource usage.

5. The processing system according to claim 4, wherein fallback mechanisms are provided for a backward-compatibility between the application classes.

6. The processing system according to claim 4, wherein said generic framework is based on a communication model with different functional communication levels for exploiting the various resources in a coordinated manner so as to achieve the desired overall QoS level.

7. The processing system according to claim 6, wherein said communication levels include an application, a session, an association and a stream level.

8. The processing system according to claim 1, wherein the QoS broker unit coordinates an external network resource booker unit which manages network resource reservation mechanisms in an implementation independent way.

9. The processing system according to claim 1, further comprising a session manager unit being coordinated by the QoS broker unit for establishing and managing sessions in an implementation independent way.

10. The processing system according to claim 9, further comprising one or more chain coordinator units being managed by the QoS broker unit through the session manager unit and managing one or more component chains, each chain being associated with a stream.

11. The processing system according to claim 10, further comprising one or more CPU-manager units coordinated by the chain coordinator units for managing CPU-resource usage.

12. The processing system according to claim 11, further comprising a CPU-resource controller unit providing said CPU-manager units with platform independent resource status information retrieval and control.

13. The processing system according to claim 10, further comprising one or more memory manager units coordinated by the chain coordinator units for managing memory resource usage.

14. The processing system according to claim 13, further comprising a memory controlling unit for providing the memory manager units with platform-independent resource status information retrieval and control.

15. The processing system according to claim 10, further comprising one or more network protocol manager units coordinated by the chain coordinator units for managing network protocol resource usage.

16. The processing system according to claim 15, further comprising a network protocol controller unit for providing the network protocol manager units with resource status information retrieval and control.

17. The processing system according to claim 10, further comprising one or more multimedia components coordinated by the chain coordinator units for managing multimedia resources.

18. The processing system according to claim 17, further comprising a multimedia controller providing the multimedia component units with platform independent resource status information retrieval and control.

19. A computer readable storage medium for a wireless mobile device for communication in a wireless communication network, being loadable in memory means of the wireless mobile device, said wireless mobile device comprising a component coordinator unit, said storage medium having a program stored therein for the purpose of performing a method of providing applications, said method comprising the steps of:
  providing applications of the wireless mobile device with a generic platform and network-independent framework which uses a platform and network-neutral set of application adaptation mechanisms including a QoS negotiation and re-negotiation protocol; and
  providing a QoS broker unit being managed by the component coordinator unit and coordinating the management of resources of the wireless mobile device and of remote resources by using said negotiation and re-negotiation protocol,
  wherein said wireless mobile device is a resource constrained wireless mobile unit without additional support from the network.

20. The computer readable storage medium according to claim 19, wherein said protocol uses piggyback mechanisms for Qos negotiating and re-negotiating.

21. The computer readable storage medium according to claim 19, wherein said generic framework addresses different types of applications including existing applications and applications that rely on middleware.

22. The computer readable storage medium according to claim 19, wherein said generic framework is based on an application model in which each application is allocated to one of a set of application classes having different QoS level with respect to resource usage.

23. The computer readable storage medium according to claim 22, wherein fullback mechanisms are provided for a backward-compatibility between the application classes.

24. The computer readable storage medium according to claim 22, wherein said generic framework is based on a communication model with different functional communication levels for exploiting the various resources in a coordinated manner so as to achieve the desired overall QoS level.

25. The computer readable storage medium according to claim 24, wherein said communication levels include an application, a session, an association and a stream level.

26. The computer readable storage medium according to claim 19, further comprising a network resource booker unit being coordinated by the Qos broker unit and managing network resource reservation mechanisms in an implementation independent way.

27. The computer readable storage medium according to claim 19, further comprising a session manager unit being coordinated by the QoS broker unit for establishing and managing sessions in an implementation independent way.

28. The computer readable storage medium according to claim 27, further comprising one or more chain coordinator units being managed by the QoS broker unit through the session manager unit and managing one or more component chains, each chain being associated with a stream.

29. The computer readable storage medium according to claim 28, further comprising one or more CPU-manager units coordinated by the chain coordinator units for managing CPU-resource usage.

30. The computer readable storage medium according to claim 29, further comprising a CPU-resource controller unit providing said CPU-manager units with platform independent resource status information retrieval and control.

31. The computer readable storage medium according to claim 28, further comprising one or more memory manager units coordinated by the chain coordinator units for managing memory resource usage.

32. The computer readable storage medium according to claim 31, further comprising a memory controlling unit for providing the memory manager units with platform-independent resource status information retrieval and control.

33. The computer readable storage medium according to claim 28, further comprising one or more network protocol manager units coordinated by the chain coordinator units for managing network protocol resource usage.

34. The computer readable storage medium according to claim 33, further comprising a network protocol controller unit for providing the network protocol manager units with resource status information retrieval and control.

35. The computer readable storage medium according to claim 28, further comprising one or more multimedia components coordinated by the chain coordinator units for managing multimedia resources.

36. The computer readable storage medium according to claim 35, further comprising a multimedia controller providing the multimedia component units with platform independent resource status information retrieval and control.

37. A method for communicating with a wireless mobile device in a wireless communication network, said method comprising:
  providing applications of the wireless mobile device with a generic platform and network-independent framework which uses a platform and network-neutral set of application adaptation mechanisms including a QoS negotiation and re-negotiation protocol; and providing a QoS broker unit being managed by a component coordinator unit and coordinating the management of resources of the wireless mobile device and of remote resources by using said negotiation and re-negotiation protocol, wherein said wireless mobile device is a resource constrained wireless mobile unit without additional support from the network.

\* \* \* \* \*